(12) United States Patent
Owen et al.

(10) Patent No.: US 12,373,736 B1
(45) Date of Patent: Jul. 29, 2025

(54) PERFORMANCE OPTIMIZATION PREDICTIONS RELATED TO AN ENTITY DATASET BASED ON A MODIFIED VERSION OF A PREDEFINED FEATURE SET FOR A CANDIDATE MACHINE LEARNING MODEL

(71) Applicant: StatSketch Inc., San Francisco, CA (US)

(72) Inventors: Samuel Owen, St. Louis, MO (US); Corne Nagel, Agoura Hills, CA (US); Anthony Chong, San Francisco, CA (US)

(73) Assignee: StatSketch Inc., San Francisco, CA (US)

( * ) Notice: Subject to any disclaimer, the term of this patent is extended or adjusted under 35 U.S.C. 154(b) by 0 days.

(21) Appl. No.: 18/410,374

(22) Filed: Jan. 11, 2024

(51) Int. Cl.
*G06N 20/00* (2019.01)

(52) U.S. Cl.
CPC .................... *G06N 20/00* (2019.01)

(58) Field of Classification Search
CPC ....................................................... G06N 20/00
See application file for complete search history.

(56) References Cited

U.S. PATENT DOCUMENTS

| | | | |
|---|---|---|---|
| 2014/0100703 A1* | 4/2014 | Dull | F03D 17/00 700/289 |
| 2019/0102700 A1 | 4/2019 | Babu et al. | |
| 2019/0110753 A1* | 4/2019 | Zhang | A61B 3/0025 |
| 2020/0202256 A1* | 6/2020 | Chaudhari | G06F 18/23 |
| 2021/0012239 A1 | 1/2021 | Arzani et al. | |
| 2021/0158085 A1 | 5/2021 | Budzik | |
| 2021/0325861 A1 | 10/2021 | Hou et al. | |
| 2022/0269597 A1 | 8/2022 | Kim et al. | |
| 2022/0292401 A1* | 9/2022 | Xu | G06N 3/045 |
| 2023/0308474 A1* | 9/2023 | Thompson | H04L 63/1433 |

(Continued)

OTHER PUBLICATIONS

Khurana U, Samulowitz H, Turaga D. Feature engineering for predictive modeling using reinforcement learning. InProceedings of the AAAI Conference on Artificial Intelligence Apr. 29, 2018 (vol. 32, No. 1). (Year: 2018).*

(Continued)

*Primary Examiner* — Oluwatosin Alabi
(74) *Attorney, Agent, or Firm* — Alston & Bird LLP

(57) ABSTRACT

Embodiments of the present disclosure provide for providing performance optimization predictions related to an entity dataset. Such embodiments may include selecting a candidate machine learning model from a plurality of candidate machine learning models based at least in part on (i) a data profile for an entity dataset associated with an entity identifier and (ii) a predefined model profile associated with the candidate machine learning model. Such embodiments may additionally or alternatively include generating a candidate feature set by modifying a predefined feature set for the candidate machine learning model based at least in part on the data profile associated with the entity identifier. Such embodiments may additionally or alternatively include generating one or more performance optimization data objects by applying the candidate machine learning model to the candidate feature set based at least in part on an objective rules set for the entity identifier.

20 Claims, 12 Drawing Sheets

(56) References Cited

U.S. PATENT DOCUMENTS

2023/0334367 A1    10/2023    Asher et al.
2023/0368773 A1*   11/2023    Mishra .................... G06F 3/167
2025/0014683 A1*    1/2025    McWhirter ............ G16B 15/20

OTHER PUBLICATIONS

Liu DR, Li HL, Wang D. Feature selection and feature learning for high-dimensional batch reinforcement learning: A survey. International Journal of Automation and Computing. Jun. 2015;12(3):229-42. (Year: 2015).*
Agostinelli et al., "Transferability Metrics for Selecting Source Model Ensembles," 12 pages, (Mar. 31, 2022).
Bolya et al., "Scalable Diverse Model Selection for Accessible Transfer Learning," 35th Conference on Neural Information Processing Systems, 21 pages, (Jan. 11, 2022).
Extended European Search Report Mailed on May 12, 2025 for EP Application No. 24219542, 11 page(s).
ISA/220—Notification of Transmittal or Search Report and Written Opinion of the ISA, or the Declaration Mailed on Apr. 23, 2025 for WO Application No. PCT/US25/010157, 2 page(s).
Outgoing—ISA/210—International Search Report Mailed on Apr. 23, 2025 for WO Application No. PCT/US25/010157, 3 page(s).
Outgoing Written Opinion of the ISA Mailed on Apr. 23, 2025 for WO Application No. PCT/US25/010157, 4 page (s).

\* cited by examiner

PERFORMANCE OPTIMIZATION PREDICTIONS RELATED TO AN ENTITY DATASET BASED ON A MODIFIED VERSION OF A PREDEFINED FEATURE SET FOR A CANDIDATE MACHINE LEARNING MODEL

TECHNOLOGICAL FIELD

Embodiments of the present disclosure generally relate to predictive modeling using machine learning, and more particularly to providing performance optimization predictions related to an entity dataset using automated reinforcement learning.

BACKGROUND

Machine learning systems typically utilize feature extraction techniques to transform a dataset into a particular feature set for a machine learning model. These feature extraction techniques typically rely on computationally time-consuming, resource intensive, and/or error-prone processes, such as manual interactions facilitated by users interacting with computing systems, to transform a dataset into a particular feature set for a machine learning model and/or training a machine learning model based on the dataset. However, Applicant has discovered problems with current machine learning systems and/or machine learning modeling techniques that result in poor performance of the underlying computing systems. Through applied effort, ingenuity, and innovation, Applicant has solved many of these identified problems by developing embodied in the present disclosure, which are described in detail below.

BRIEF SUMMARY

In an embodiment, an apparatus comprises one or more processors and one or more storage devices storing instructions that are operable, when executed by the one or more processors, to cause the one or more processors to select a candidate machine learning model from a plurality of candidate machine learning models based at least in part on (i) a data profile for an entity dataset associated with an entity identifier and (ii) a predefined model profile associated with the candidate machine learning model. In one or more embodiments, the candidate machine learning model is trained for one or more performance optimization tasks associated with a particular entity classification. In one or more embodiments, the one or more storage devices additionally or alternatively store instructions that are operable, when executed by the one or more processors, to cause the one or more processors to generate a candidate feature set by modifying a predefined feature set for the candidate machine learning model based at least in part on the data profile associated with the entity identifier. In one or more embodiments, the one or more storage devices additionally or alternatively store instructions that are operable, when executed by the one or more processors, to cause the one or more processors to generate one or more performance optimization data objects by applying the candidate machine learning model to the candidate feature set based at least in part on an objective rules set for the entity identifier. In one or more embodiments, the one or more storage devices additionally or alternatively store instructions are operable, when executed by the one or more processors, to cause the one or more processors to initiate one or more predictive-based actions based at least in part on the one or more performance optimization data objects.

In another embodiment, a computer-implemented method is provided. In one or more embodiments, the computer-implemented method provides for selecting a candidate machine learning model from a plurality of candidate machine learning models based at least in part on (i) a data profile for an entity dataset associated with an entity identifier and (ii) a predefined model profile associated with the candidate machine learning model. In one or more embodiments, the candidate machine learning model is trained for one or more performance optimization tasks associated with a particular entity classification. In one or more embodiments, the computer-implemented method additionally or alternatively provides for generating a candidate feature set by modifying a predefined feature set for the candidate machine learning model based at least in part on the data profile associated with the entity identifier. In one or more embodiments, the computer-implemented method additionally or alternatively provides for generating one or more performance optimization data objects by applying the candidate machine learning model to the candidate feature set based at least in part on an objective rules set for the entity identifier. In one or more embodiments, the computer-implemented method additionally or alternatively provides for initiating one or more predictive-based actions based at least in part on the one or more performance optimization data objects.

In yet another embodiment, a computer program product, stored on a computer readable medium, comprises instructions that when executed by one or more computers cause the one or more computers to select a candidate machine learning model from a plurality of candidate machine learning models based at least in part on (i) a data profile for an entity dataset associated with an entity identifier and (ii) a predefined model profile associated with the candidate machine learning model. In one or more embodiments, the candidate machine learning model is trained for one or more performance optimization tasks associated with a particular entity classification. In one or more embodiments, the computer program product additionally or alternatively comprises instructions that when executed by one or more computers cause the one or more computers to generate a candidate feature set by modifying a predefined feature set for the candidate machine learning model based at least in part on the data profile associated with the entity identifier. In one or more embodiments, the computer program product additionally or alternatively comprises instructions that when executed by one or more computers cause the one or more computers to generate one or more performance optimization data objects by applying the candidate machine learning model to the candidate feature set based at least in part on an objective rules set for the entity identifier. In one or more embodiments, the computer program product additionally or alternatively comprises instructions that when executed by one or more computers cause the one or more computers to initiate one or more predictive-based actions based at least in part on the one or more performance optimization data objects.

Various other embodiments are also described in the following detailed description and in the attached claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Having thus described the embodiments of the disclosure in general terms, reference now will be made to the accompanying drawings, which are not necessarily drawn to scale, and wherein.

DETAILED DESCRIPTION

Figure 1:
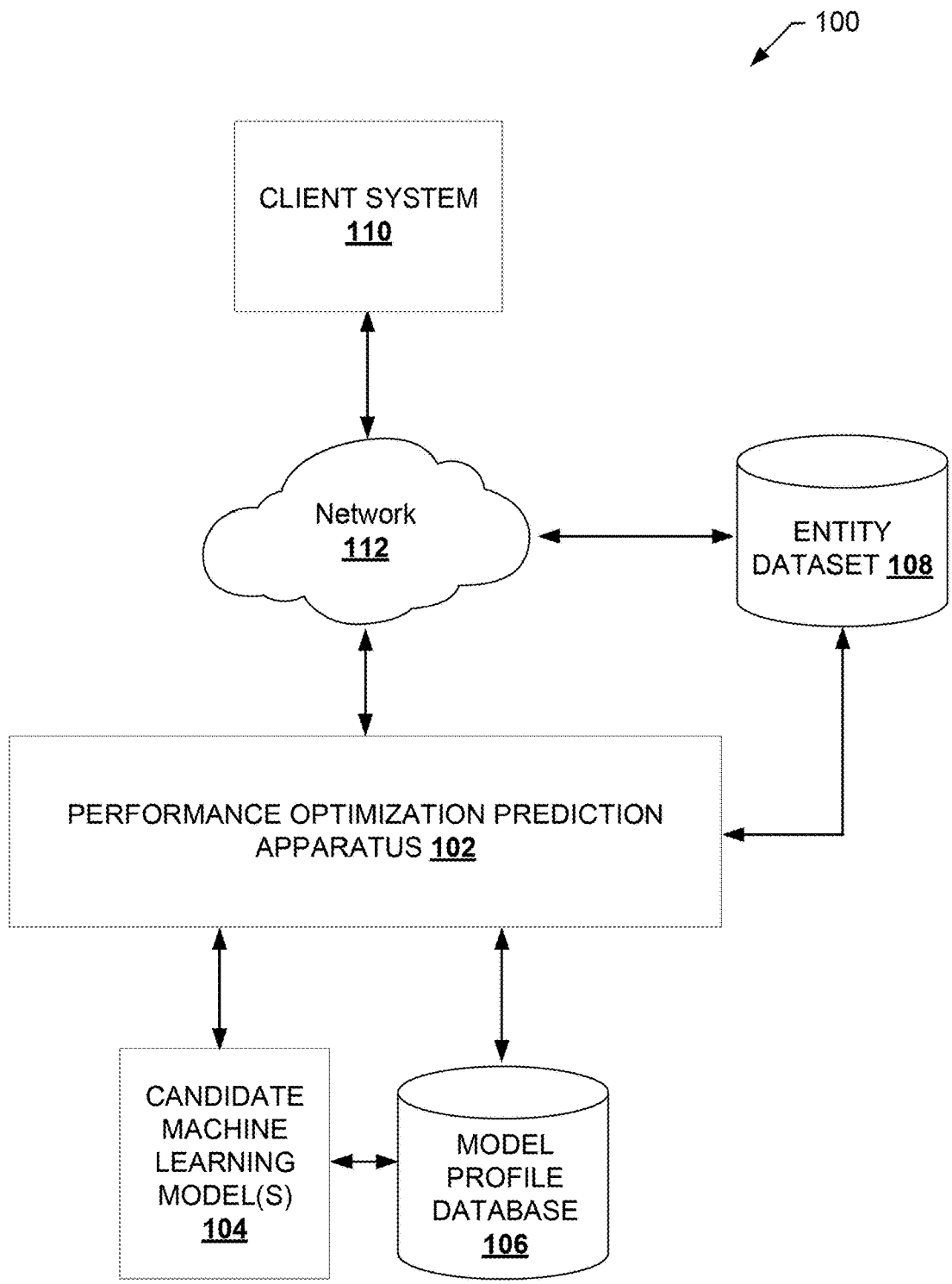
FIG. 1 illustrates a block diagram of a system that can be specially configured within which at least one example embodiment of the present disclosure may operate.

Embodiments of the present disclosure now will be described more fully hereinafter with reference to the accompanying drawings, in which some, but not all, embodiments of the disclosure are shown. Indeed, embodiments of the disclosure can be embodied in many different forms and should not be construed as limited to the embodiments set forth herein, rather, these embodiments are provided so that this disclosure will satisfy applicable legal requirements. Like numbers refer to like elements throughout.

Overview

Feature extraction is a machine learning technique for transforming a dataset into a particular feature set for a machine learning model (e.g., for training and executing one or more machine learning models). However, extraction of features from a dataset is often computationally time-consuming, resource intensive, and/or prone to errors. Moreover, training a new machine learning model from scratch based on the extracted features may be similarly computationally time-consuming, resource intensive, and/or prone to errors. For example, a dataset may include a vast amount of data, complex data associated with high-dimensionality, and/or data from disparate data sources. Such datasets are often necessary for training accurate machine learning models, but their use comes at the expense of time and computational resources. For example, current computing systems using conventional machine learning techniques require extensive processing resources, and are often processor limited, when generating one or more machine learning models using robust data sets for immediate use. The computational resource usage requirements exponentially increase when factoring in the trial-and-error approach of attempting to test multiple models and/or iterations of a model to generate an optimal machine learning model.

Additionally, features extracted from a dataset may result in data loss with respect to the dataset, overfitting or underfitting of the features for a particular machine learning task, and/or irrelevant features for a particular machine learning task. Extraction of features from a dataset may also involve manual interactions facilitated by users interacting with computing systems in order to transform a dataset into a particular feature set for a machine learning model. Moreover, typical feature extraction and related machine learning techniques for providing desired predictions with respect to a dataset typically require months to accomplish, resulting in further inefficiencies for computing resources. As such, machine learning systems have not been capable of handling such machine learning processing of datasets during a desirable interval of time (e.g., real time, near-real time, hours, days, etc.) without solutions according to the various embodiments herein. Such technical issues may further impact accuracy of predictions or other output provided by the machine learning model.

Embodiments of the present disclosure address technical challenges related to machine learning data analysis in a computationally efficient and predictively reliable manner. Existing machine learning data analysis systems are generally ill-suited to accurately, efficiently, and/or reliably perform predictive data analysis in various domains, such as domains that are associated with high-dimensional categorical feature spaces with a high degree of cardinality.

To account for these and/or other technical issues related to typical machine learning systems, embodiments of the present disclosure utilize transfer learning to determine a candidate machine learning model from previously generated machine learning models. The previously generated machine learning models may be used to generate the candidate machine learning models via transfer learning to generate predictions associated with the performance of a future, yet-untrained machine learning model based on the previously generated machine learning models, where the yet-untrained machine learning model is a new model trained on new datasets (e.g., datasets not used to train and/or execute the previously generated machine learning model) associated with a new entity. The candidate machine learning model(s) can be utilized to provide one or more performance optimization predictions related to an entity dataset. Additionally, the candidate machine learning model can be applied to a modified version of a predefined feature set for the candidate machine learning model to provide the one or more performance optimization predictions. In some examples, a performance optimization prediction may provide a predicted improved return on investment (ROI) related to the entity dataset by a future, yet-untrained machine learning model based on the candidate machine learning model(s). For example, the ROI may include the predicted performance of the yet-untrained machine learning model offset by the resource consumption required to run the model. In various embodiments, one or more predictive-based actions can be initiated via the one or more performance optimization predictions.

In various embodiments, a candidate machine learning model is a previously trained machine learning model that is previously trained based on a prior entity dataset for a prior entity that is different than a new entity for the one or more performance optimization predictions. Accordingly, the transfer learning disclosed herein may utilize a candidate machine learning model (e.g., a pre-trained machine learning model) related to a prior entity for a new performance optimization prediction task related to the new entity while minimizing an amount of retraining or without requiring retraining of the candidate machine learning model for the new performance optimization prediction task. However, it is to be appreciated that, in certain embodiments, the candidate machine learning model may undergo one or more full training stages for the new performance optimization prediction task. Additionally, regardless of the degree of training, the candidate machine learning model may be trained without utilization of one or more portions of an entity dataset for a new entity where one or more performance optimization predictions are desirable. Accordingly, an amount of data gathering and/or utilization of computing resources for training the candidate machine learning model may be minimized. In various embodiments, a feature set related to the prior entity dataset may be modified based on data for the new entity. As such, the modified feature set may include old data related to the prior entity dataset and/or new data for the new performance optimization prediction task. The new data may be related to the prior entity, the new entity, or a combination thereof. The new data may additionally or alternatively include data unrelated to the prior entity or the new entity. Additionally, the candidate machine learning model may be applied to the modified feature set for the new entity to provide the one or more performance optimization predictions for the new entity.

The one or more predictive-based actions can be related to rendering of visual content via an electronic interface, initiating application programming interface (API) actions associated with a dashboard visualization, initiating one or more actions related to a cloud computing platform, optimizing a machine learning model, facilitating and/or triggering training and/or selection of a new machine learning model (e.g., based on a selected candidate machine learning model), enhancing a training dataset for a machine learning model, and/or one or more other types of predictive-based actions. In some embodiments, the systems, methods, and apparatuses discussed herein may be configured to automatically generate the one or more performance optimization predictions and/or one or more predictive-based actions based on receipt of an entity dataset and/or entity identifier. In some embodiments, the one or more predictive-based actions may include triggering training and/or execution of a new machine learning model having a model profile corresponding to a selected candidate machine learning model using the entity dataset. In some embodiments, a subsequent new machine learning model may be trained and/or executed in a subsequent cycle following execution of the new machine learning model based on collection of electronic communication response data, which may include generation of a new set of one or more performance optimization predictions based on the electronic communication response data.

To provide the one or more performance optimization predictions, the one or more embodiments of the present disclosure can be implemented via an artificial intelligence (AI) platform. In various embodiments, the candidate machine learning model can be configured according to an objective rules set for an entity identifier related to the entity database. The objective rules set may include defined guardrails, preferred strategies, defined objectives, and/or other data related to the entity identifier. In some examples, the entity identifier is a candidate customer that may access and utilize the AI platform and/or the candidate machine learning model for obtaining the one or more performance optimization predictions. In some examples, a performance optimization prediction may provide one or more recommended deviations from defined guardrails, preferred strategies, and/or defined objectives to further improve the ROI.

In various embodiments, the AI platform may provide and/or utilize an interactive graphical user interface (GUI) to present and/or modify information related to one or more performance optimization predictions. For example, the GUI may be a feedback-driven interactive GUI to enable human interpretable visualizations and/or human interactions (e.g., a human-in-the-loop process) with respect to the one or more performance optimization predictions. In various embodiments, the GUI may enable a visual rendering and/or modification of a performance optimization prediction (e.g., in real time). In various embodiments, the GUI may enable a user to finely tune defined guardrails, preferred strategies, and/or defined objectives to further improve a performance optimization prediction. The GUI may additionally or alternatively enable comparison of different models, guardrails, preferred strategies, and/or defined objectives to optimize a performance optimization prediction for an entity identifier. In various embodiments, the GUI may enable initialization and/or configuration of features, parameters, weights, and/or other settings of a machine learning model to prime the machine learning model for performance optimization predictions.

Various embodiments of the present disclosure resolve and/or improve typical machine learning systems by providing for both improvements in efficiency as well as reductions in error, inconsistencies, and/or other problems associated with existing machine learning systems, both within an individual machine learning model and within a machine learning system that generates and executes individual machine learning models. For instance, by utilizing one or more embodiments related to the AI platform as disclosed herein, the candidate machine learning model and/or related feature dataset can be configured for the entity identifier within a desirable interval of time (e.g., real time, near-real time, hours, days, etc.). In various embodiments, the candidate machine learning model configured by the AI platform can provide optimized use and/or transformation of a dataset while maintaining relevancy of machine learning insights related to a particular domain during the desirable interval of time, even in scenarios where one or more portions of the dataset is updated and/or modified over time. A number of computing resource and/or a number of errors for retraining of the candidate machine learning model for the entity identifier can be further minimized by utilizing one or more embodiments related to the AI platform as disclosed herein. Moreover, the candidate machine learning model can be further improved for the entity identifier via reinforcement learning with respect to new data for the entity dataset. In some embodiments, a dashboard visualization at an electronic interface may be generated to allow a user to visualize and/or manipulate aspects of the candidate machine learning model(s) and/or the input data (e.g., the objective rules set and/or candidate feature set) to generate updates to the performance optimization data objects (e.g., in real time or near real time).

Example Systems

FIG. 1 illustrates a block diagram of a system that can be specially configured within which embodiments of the present disclosure may operate. Specifically, FIG. 1 illustrates an example system 100. The example system 100 includes a performance optimization prediction apparatus 102, a set of candidate machine learning models 104, a model profile database 106, an entity dataset 108, and/or a client system 110. In one or more embodiments, the system 100 includes at least one network 112 that enables transmission of data between one or more subsystem(s) and/or device(s) of the system 100.

The performance optimization prediction apparatus 102 includes one or more computer(s) embodied in hardware, software, firmware, and/or a combination thereof. In some embodiments, the performance optimization prediction apparatus 102 includes one or more application server(s), database server(s), enterprise computing terminal(s), and/or the like that are configured to perform the functionality described herein. In some embodiments, the performance optimization prediction apparatus 102 embodies or includes a backend system (e.g., one or more enterprise server(s)) that are communicable over one or more network(s) (e.g., via the Internet). Additionally or alternatively, in some embodiments, the performance optimization prediction apparatus 102 includes one or more virtual computer(s) embodied in a software environment maintained via particular hardware, for example where the performance optimization prediction apparatus 102 is maintained as a virtual environment on hardware of a central terminal supporting multiple software application(s). In some embodiments, the performance optimization prediction apparatus 102 includes one or more hardware device(s) within the same physically defined space, such as a data warehouse, company headquarters, and/or the like associated with a particular entity. Alternatively or additionally, in some embodiments, the performance optimization prediction apparatus 102 includes one or more hardware and/or software device(s) located remotely from one another and that communicate in conjunction with one another to provide the described functionality, for example embodied by one or more cloud computing system(s).

In some embodiments, the performance optimization prediction apparatus 102 includes a plurality of sub-services that each support a portion of the functionality performed by the performance optimization prediction apparatus 102. In some such embodiments, the plurality of sub-services may each be embodied by different hardware, software, firmware, and/or any combination thereof. Alternatively or additionally, in some embodiments, one or more of the sub-services share particular hardware, software, firmware, and/or any combination thereof. For example, in some embodiments, the performance optimization prediction apparatus 102 may embody specially-configured software applications executed on shared hardware.

In some embodiments, the performance optimization prediction apparatus 102 supports an AI platform for providing one or more performance optimization predictions related to the entity dataset 108. The entity dataset 108 can include document data, email data, fax data, electronic message data, notification data, electronic data interchange (EDI) data, communication channel data, API data, report data, text recognition data, voice recognition data, optical character recognition (OCR) data, text-to-speech data, sensor data, metadata, and/or other data. In certain embodiments, the entity dataset 108 can aggregated from multiple data sources.

In certain embodiments, the performance optimization prediction apparatus 102 can transmit one or more data requests to a data source to request one or more portions of the entity dataset 108. In certain embodiments, the performance optimization prediction apparatus 102 can transmit one or more data requests to a data source based on one or more actions performed via an electronic interface and/or another input mechanism of the client system 110. In certain embodiments, at least a portion of the entity dataset 108 can be pre-processed by one or more data sources and/or by the performance optimization prediction apparatus 102. For example, at least a portion of the entity dataset 108 can be pre-processed by the client system 110 and/or the performance optimization prediction apparatus 102 to provide text recognition data, voice recognition data, OCR data, text-to-speech data, and/or other processed data. Additionally or alternatively, at least a portion of the electronic data can be processed by a machine learning model to provide text recognition data, voice recognition data, OCR data, text-to-speech data, and/or other processed data. For example, a machine learning model can be configured to perform natural language processing, data classification, pattern recognition, text recognition, one or more OCR processes, and/or one or more other techniques to process data.

In some embodiments, the performance optimization prediction apparatus 102 provides such functionality associated with the client system 110. In some embodiments, the client system 110 is associated with an entity identifier. The entity identifier can be related to the entity dataset 108. For example, the entity identifier may correspond to a potential customer and the entity dataset 108 may include data related to the potential customer. In some embodiments, the client system 110 embodies a user device and/or end terminal accessible by a user to initiate functionality via the performance optimization prediction apparatus 102. For example, in some embodiments, a user enters authentication credentials via the client system 110 that are validated to initiate an authenticated session associated with the performance optimization prediction apparatus 102, such that the user may utilize the client system 110 to access functionality of the performance optimization prediction apparatus 102 associated with an asset profile and/or data associated therewith. The client system 110 in some embodiments is utilized to initiate one or more indication(s) of a trusted processing request. Additionally or alternatively, in some embodiments, the client system 110 is utilized to render electronic interface(s) that provide details associated with performance optimization predictions and/or the like. In some such embodiments, the client system 110 operates as a front-end or user-facing application for accessing such functionality of the performance optimization prediction apparatus 102.

In some embodiments, the performance optimization prediction apparatus 102 supports automatically receiving data transmissions, for example embodied by API request(s), procedure call(s), and/or other digital data transfers, that embody a request. Additionally or alternatively, in some embodiments, the performance optimization prediction apparatus 102 supports providing data via digital mechanism(s) (e.g., email, electronic portals, electronic communication channels, FTP, and/or the like).

The network 112 can be a communications network and/or can be configurable to be embodied in any of a myriad of network configurations. In some embodiments, the network 112 embodies a public network (e.g., the Internet). In some embodiments, the network 112 embodies a private network (e.g., an internal, localized, or closed-off network between particular devices). In some other embodiments, the network 112 embodies a hybrid network (e.g., a network enabling internal communication between particular connected devices and external communication with other devices). The network 112 in some embodiments includes one or more base station(s), relay(s), router(s), switch(es), cell tower(s), communications cable(s) and/or associated routing station(s), and/or the like. In some embodiments, the network 112 includes one or more computing device(s) controlled by individual entities (e.g., an entity-owner router and/or modem) and/or one or more external utility devices (e.g., Internet service provider communication tower(s) and/or other device(s)).

The computing devices of the system 100 may each communicate in whole or in part over a portion of one or more communication network(s), such as the network 112. For example, each of the components of the system 100 can be communicatively coupled to transmit data to and/or receive data from one another over the same and/or different wireless or wired networks embodying the network 112. Non-limiting examples of network configuration(s) for the network 112 include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network(s), the various embodiments are not limited to this particular architecture. In other embodiments, one or more computing entities share one or more components, hardware, and/or the like, or otherwise are embodied by a single computing device such that connection(s) between the computing entities are altered and/or rendered unnecessary. Alternatively or additionally still, in some embodiments the network 112 enables communication to one or more other computing device(s) not depicted, for example client device(s) for accessing functionality of any of the subsystems therein via native and/or web-based application(s), and/or the like.

Example Apparatus

Figure 2:
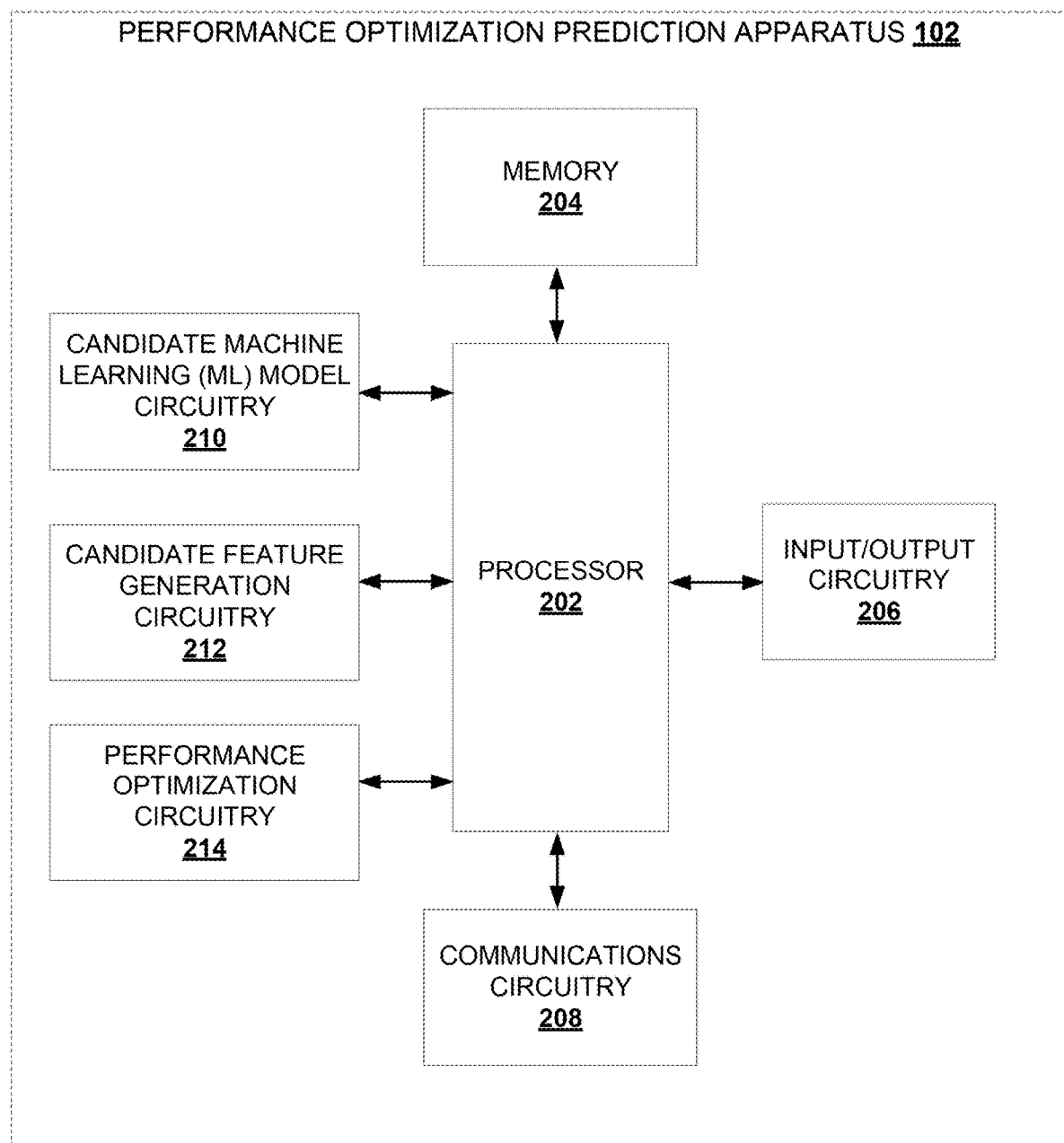
FIG. 2 illustrates a block diagram of an example apparatus that can be specially configured in accordance with at least one example embodiment of the present disclosure.

FIG. 2 illustrates a block diagram of an example apparatus that can be specially configured in accordance with at least one example embodiment of the present disclosure. Specifically, FIG. 2 illustrates the performance optimization prediction apparatus 102 in accordance with at least one example embodiment of the present disclosure. The performance optimization prediction apparatus 102 includes processor 202, memory 204, input/output circuitry 206, communications circuitry 208, candidate machine learning (ML) model circuitry 210, candidate feature generation circuitry 212, and performance optimization circuitry 214. In some embodiments, the performance optimization prediction apparatus 102 is configured, using one or more of the sets of circuitry 206, 208, 210, 212, and/or 214, to execute and perform one or more of the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the performance optimization prediction apparatus 102 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the performance optimization prediction apparatus 102 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the performance optimization prediction apparatus 102. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the performance optimization prediction apparatus 102 to carry out various functions in accordance with example embodiments of the present disclosure.

The processor 202 can be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the performance optimization prediction apparatus 102, and/or one or more remote or "cloud" processor(s) external to the performance optimization prediction apparatus 102.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed. In some embodiments, the processor 202 includes or is embodied by a CPU, microprocessor, and/or the like that executes computer-coded instructions, for example stored via the non-transitory memory 204.

In some embodiments, the performance optimization prediction apparatus 102 includes input/output circuitry 206 that provides output to the user and, in some embodiments, to receive an indication of a user input. In some embodiments, the input/output circuitry 206 is in communication with the processor 202 to provide such functionality. The input/output circuitry 206 may comprise one or more user interface(s) and in some embodiments includes a display that comprises the interface(s) rendered as an electronic interface, a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor can be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments, the input/output circuitry 206 includes hardware, software, firmware, and/or a combination thereof, that facilitates simultaneously display of particular data via a plurality of different devices.

In some embodiments, the performance optimization prediction apparatus 102 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the performance optimization prediction apparatus 102. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device, capture device, and/or other external computing device in communication with the performance optimization prediction apparatus 102.

In some embodiments, the performance optimization prediction apparatus 102 includes the candidate ML model circuitry 210. The candidate ML model circuitry 210 includes hardware, software, firmware, and/or a combination thereof, that supports various functionality associated with generating and/or selecting a candidate machine learning model for an entity identifier. For example, in some embodiments, the candidate ML model circuitry 210 includes hardware, software, firmware, and/or a combination thereof, that selects a candidate machine learning model from the set of candidate machine learning models 104. The candidate ML model circuitry 210 may select the candidate machine learning model based at least in part on a data profile for the entity dataset 108 and a predefined model profile associated with the candidate machine learning model. The predefined model profile can be stored, for example, in the model profile database 106. In some embodiments, the candidate ML model circuitry 210 includes hardware, software, firmware, and/or a combination thereof, that selects two or more candidate machine learning models from the set of candidate machine learning models 104. Additionally, the candidate ML model circuitry 210 can select an optimal candidate machine learning model from the two or more candidate machine learning models based on a comparison of predicted optimization output from the two or more candidate machine learning models. Additionally or alternatively, in some embodiments, the candidate ML model circuitry 210 includes hardware, software, firmware, and/or a combination thereof, that enables access to one or more API(s), FTP connection(s), and/or the like to securely acquire, receive, retrieve, and/or otherwise identify entity data from one or more system(s) external from the performance optimization prediction apparatus 102 such as, for example, the entity dataset 108. In some embodiments, the candidate ML model circuitry 210 includes a separate processor, specially configured field programmable gate array (FPGA), or a specially programmed application specific integrated circuit (ASIC).

In some embodiments, a candidate machine learning model from the set of candidate machine learning models 104 refers to a data construct that describes parameters, hyperparameters, coefficients, and/or defined operations to provide one or more predictions, inferences, labels, and/or classifications related to an entity dataset. In various embodiments, a candidate machine learning model utilizes one or more machine learning techniques using parameters, hyperparameters, and/or defined operations. A candidate machine learning model may include one or more of any type of machine learning model including one or more supervised, unsupervised, semi-supervised, reinforcement learning models, and/or the like. For instance, a candidate machine learning model may include a semi-supervised model that can be trained using a training dataset. In some examples, a candidate machine learning model may include multiple models configured to perform one or more different stages of a prediction, inference, and/or classification process.

A candidate machine learning model may include one or more of any type of machine learning model including one or more supervised models, one or more unsupervised models, one or more semi-supervised models, and/or the like. In some embodiments, a candidate machine learning model is a neural network, a deep learning model, a convolutional neural network model, a classification model, a logistic regression model, a decision tree, a random forest, support vector machine (SVM), a Naïve Bayes classifier, and/or any other type of machine learning model. For instance, a candidate machine learning model may include one or more rule-based layers that depend on trained parameters, hyperparameters, coefficients, defined operations, and/ or the like. In some examples, a candidate machine learning model is a supervised model such as a XGBoost model, a gradient boosted machine, generalized linear model, a k-Nearest neighbors model, a logistic regression model, a Gaussian Naïve Bayes model, or another type of model.

In some embodiments, a candidate machine learning model is an ensemble of multiple types of machine learning models. In a non-limiting example, a candidate machine learning model is an ensemble of supervised learning models that includes an XGBoost model, a deep learning model with a parameter set generated based on a grid search, a deep learning model with a parameter set generated based on a random search, a gradient boosted machine with a parameter set generated based on a random search, an XGBoost model with a parameter set generated based on a grid search, a generalized linear model, a k-Nearest neighbors model with a parameter set generated based on random search, a logistic regression model, and/or a Gaussian Naïve Bayes model. With an ensemble of multiple types of machine learning models, the machine learning models may be individually trained and scored such that respective predictions (e.g., performance optimization predictions) are weighted for improved accuracy and/or generalizability to different sets of data and/or prediction tasks. However, it is to be appreciated that, in certain embodiments, a candidate machine learning model may be a different type of machine learning or a different ensemble of machine learning models.

In some examples, a candidate machine learning model is trained (e.g., by updating the one or more parameters, and/or the like) using one or more training techniques. In some embodiments, a candidate machine learning model utilizes reinforcement learning to provide a trained version of the candidate machine learning model. Additionally, in some embodiments, a candidate machine learning model utilizes a defined confidence threshold to provide the one or more predictions, inferences, labels, and/or classifications related to an entity dataset. In some examples, a configuration, type, and/or other characteristics of a candidate machine learning model can be dependent on the particular entity domain (e.g., a particular entity classification). In various embodiments, a candidate machine learning model is trained, using a training dataset, to generate a classification (and/or probability thereof) for a particular entity domain (e.g., a particular entity classification).

In some embodiments, the performance optimization prediction apparatus 102 includes the candidate feature generation circuitry 212. The candidate feature generation circuitry 212 includes hardware, software, firmware, and/or a combination thereof, that supports various functionality associated with generating a candidate feature set for the entity identifier. For example, in some embodiments, the candidate feature generation circuitry 212 includes hardware, software, firmware, and/or a combination thereof, that modifies a predefined feature set for the selected candidate machine learning model. The candidate feature generation circuitry 212 may modify the predefined feature set based on the data profile for the entity dataset 108. In some embodiments, the candidate feature generation circuitry 212 includes a separate processor, specially configured FPGA, or a specially programmed ASIC.

In some embodiments, the performance optimization prediction apparatus 102 includes the performance optimization circuitry 214. The performance optimization circuitry 214 includes hardware, software, firmware, and/or a combination thereof, that supports various functionality associated with providing one or more performance optimization predictions related to the entity dataset 108. For example, in some embodiments, the performance optimization circuitry 214 includes hardware, software, firmware, and/or a combination thereof, that generates one or more performance optimization data objects by applying the selected candidate machine learning model to the candidate feature set based on an objective rules set for the entity identifier. The objective rules set may include defined guardrails, preferred strategies, defined objectives, and/or other data related to the entity identifier. Additionally or alternatively, in some embodiments, the performance optimization circuitry 214 includes hardware, software, firmware, and/or a combination thereof, that initiates one or more predictive-based actions based at least in part on the one or more performance optimization data objects. The one or more predictive-based actions can be related to rendering of visual content via an electronic interface of the client system 110, initiating one or more API actions with respect to a dashboard visualization presented via a display of the client system 110, initiating one or more actions related to a cloud computing platform (e.g., an AI platform) related to the candidate machine learning models 104, optimizing one or more candidate machine learning models from the candidate machine learning models 104, enhancing a training dataset for one or more candidate machine learning models from the candidate machine learning models 104, and/or one or more other types of predictive-based actions. In some embodiments, the performance optimization circuitry 214 includes a separate processor, specially configured FPGA, or a specially programmed ASIC.

Additionally or alternatively, in some embodiments, two or more of the sets of circuitries 202-214 are combinable. Alternatively or additionally, in some embodiments, one or more of the sets of circuitry perform some or all of the functionality described associated with another component. For example, in some embodiments, two or more of the sets of circuitry 206-214 are combined into a single module embodied in hardware, software, firmware, and/or a combination thereof. Similarly, in some embodiments, one or more of the sets of circuitry, for example the candidate ML model circuitry 210, candidate feature generation circuitry 212, and/or performance optimization circuitry 214, is/are combined with the processor 202, such that the processor 202 performs one or more of the operations described above with respect to each of these sets of circuitry 210-214.

Example Data Flows for Providing Performance Optimization Predictions

Figure 3:
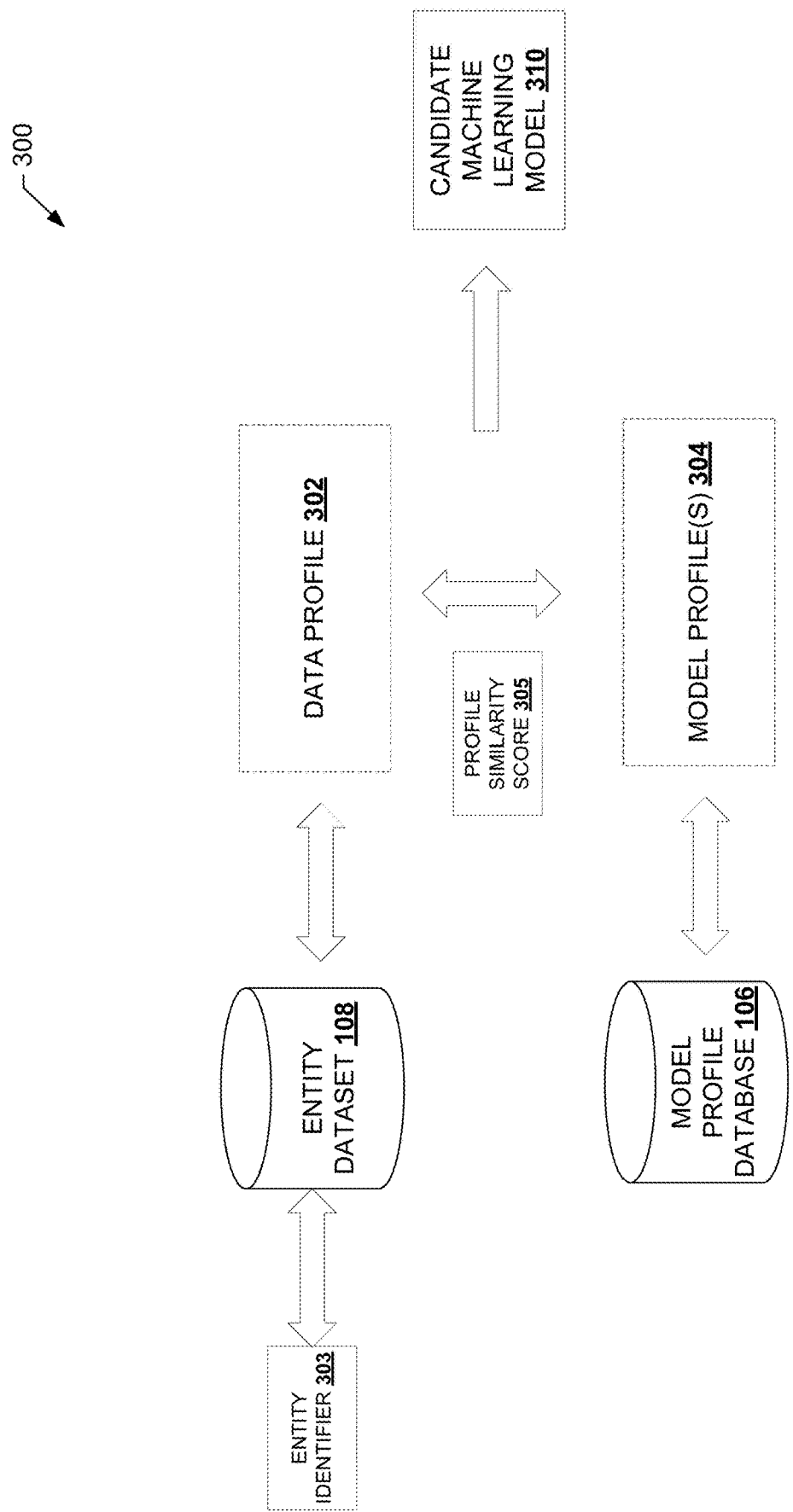
FIG. 3 illustrates an example data flow system as part of a process for selecting a candidate machine learning model in accordance with at least one example embodiment of the present disclosure.

FIG. 3 illustrates an example data flow system 300 as part of a process for selecting a candidate machine learning model in accordance with at least one example embodiment of the present disclosure. Specifically, the data flow system 300 depicts functionality between the various sub-systems of the system 100, including the performance optimization prediction apparatus 102, the candidate machine learning models 104, the model profile database 106, the entity dataset 108, the client system 110, and/or the network 112.

In various embodiments, the entity dataset 108 can be correlated to an entity identifier 303. The entity identifier 303 can identify an entity (e.g., a user, a customer, etc.) associated with the entity dataset 108. In some embodiments, the entity identifier 303 can identify an entity that utilizes the client system 110. In some embodiments, the entity identifier 303 can correspond to a sequence of formatted data such as a particular set of bits or a particular sequence of data that uniquely identifies the entity. Additionally or alternatively, the entity dataset 108 can be correlated to a data profile 302. The data profile 302 refers to a data entity that describes the entity dataset 108 and/or the entity identifier 303. In various embodiments, the data profile 302 may describe an entity classification for the entity dataset 108 and/or the entity identifier 303. For example, the data profile 302 may describe a category, an industry, an enterprise type, a customer type, a campaign type, a promotional type, an offer type, an opportunity type, a control group, a use case, an entity size, a geographic location, a geographic region, and/or another type of classification for the entity dataset 108 and/or the entity identifier 303. The data profile 302 can include a set of features, attributes, and/or other characteristics related to the entity dataset 108. Additionally or alternatively, the data profile 302 can include a set of features, attributes, and/or other characteristics related to the entity identifier 303.

In a non-limiting example, the data profile 302 is a user data profile that includes one or more features related to user. For instance, a user data profile may include one or more features related to user preferences, user objectives, an industry, an enterprise, demographics, user behavior, location, data storage preferences, transaction goals, promotion preferences, promotion objectives, revenue goals, customer information, and/or other information related to the user.

In various embodiments, the candidate ML model circuitry 210 (shown in FIG. 2) can include hardware, software, firmware, and/or a combination thereof, that compares the data profile 302 to one or more model profiles 304 of the model profile database 106. The one or more model profiles 304 can be respectively related to a particular candidate machine learning model of the candidate machine learning models 104. For example, the one or more model profiles 304 can respectively include a set of features, attributes, and/or other characteristics related to a particular candidate machine learning model of the candidate machine learning models 104. Based on the comparison between the data profile 302 and the one or more model profiles 304, the candidate ML model circuitry 210 can select a candidate machine learning model 310 for the entity identifier 303 and/or the entity dataset 108. In some embodiments, the candidate ML model circuitry 210 can determine a profile similarity score 305 between the data profile 302 and the one or more model profiles 304 to determine a most closely similar model profile for the data profile 302. For example, the profile similarity score 305 may be a data construct that describes and/or includes a value related to a degree of similarity between the data profile 302 and a respective model profile of the one or more model profiles 304. Additionally, the candidate ML model circuitry 210 can correlate the most closely similar model profile of the one or more model profiles 304 to the candidate machine learning model 310. In some embodiments, multiple candidate machine learning models may be generated (e.g., based on each of a plurality of model profiles having the highest profile similarity scores).

The candidate machine learning model 310 can be trained for one or more performance optimization tasks associated with a particular entity classification. For example, the one or more performance optimization tasks can include one or more machine learning tasks, one or more deep learning tasks, one or more transfer learning tasks, one or more insight tasks, one or more prediction tasks, one or more ROI predictions tasks, one or more revenue prediction tasks, one or more customer loyalty prediction tasks, one or more lift prediction tasks, etc. An entity classification may correspond to a category, an industry, an enterprise type, a customer type, a campaign type, a promotional type, an offer type, an opportunity type, a control group, a use case, an entity size, a geographic location, a geographic region, and/or another type of classification for an entity. In a non-limiting example, an entity classification may correspond to a particular type of industry (e.g., healthcare, retail, insurance, sports, gaming, etc.) and/or a particular location (e.g., a state, a city, a country, etc.). In various embodiments, the candidate machine learning model 310 may be trained automatically in response to receiving the entity identifier and/or entity dataset with or without a user interaction with the system to trigger the training. Additionally, the candidate machine learning model 310 may be correlated with a predefined model profile from the one or more model profiles 304. For example, the predefined model profile associated with the candidate machine learning model 310 may refer to a data entity that describes the particular entity classification for the candidate machine learning model 310.

In various embodiments, the predefined model profile associated with the candidate machine learning model 310 may describe a category, an industry, an enterprise type, a customer type, a campaign type, a promotional type, an offer type, an opportunity type, a control group, a use case, an entity size, a geographic location, a geographic region, and/or other information related to the particular entity classification for the candidate machine learning model 310. In a non-limiting example, the predefined model profile associated with the candidate machine learning model 310 may include one or more features related to preferences, objectives, an industry, an enterprise, demographics, typical user behavior, location, data storage preferences, transaction goals, promotion preferences, promotion objectives, revenue goals, customer information, and/or other information related to the particular entity classification for the candidate machine learning model 310.

Figure 4:
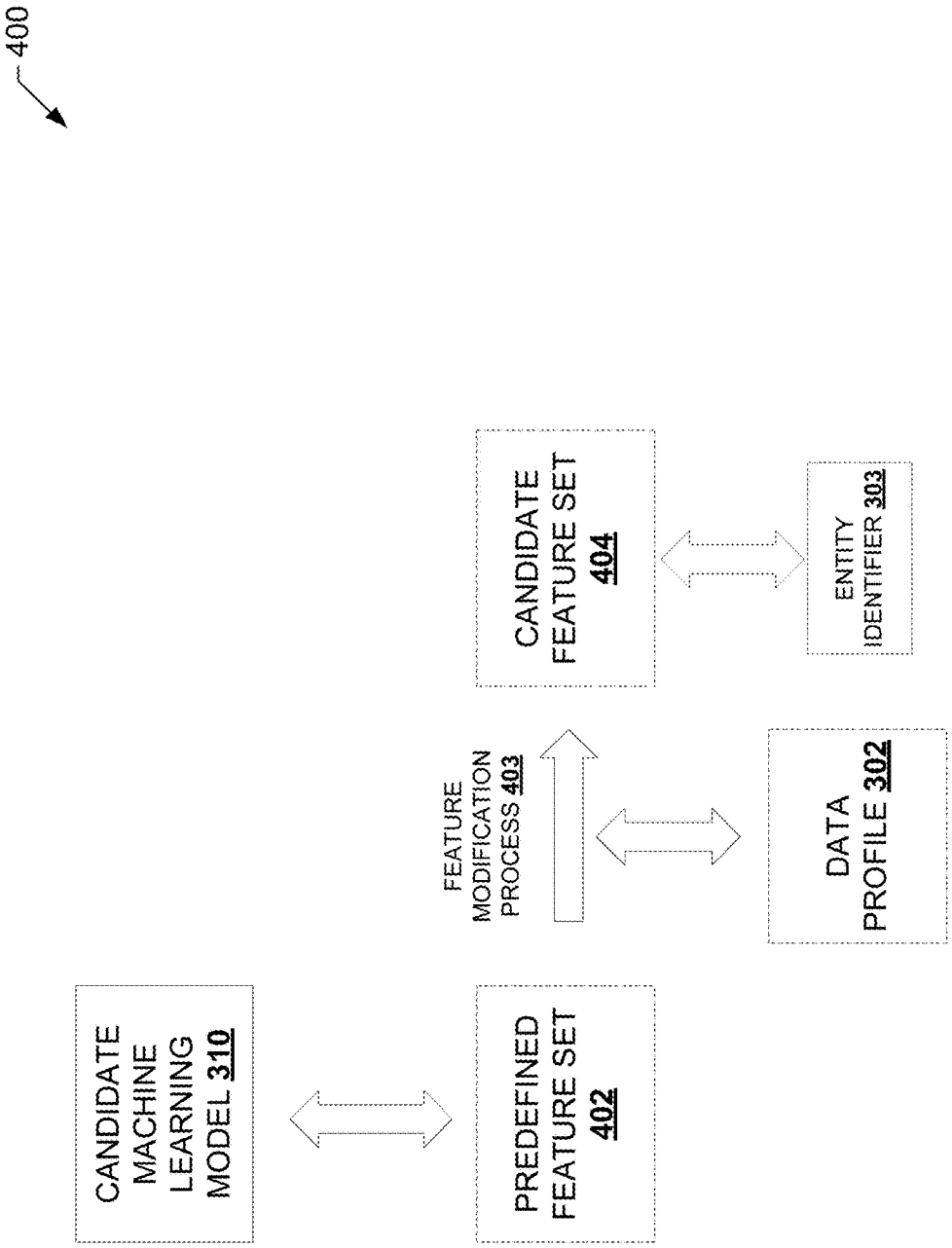
FIG. 4 illustrates an example data flow system as part of a process for generating a candidate feature set in accordance with at least one example embodiment of the present disclosure.

FIG. 4 illustrates an example data flow system 400 as part of a process for generating a candidate feature set in accordance with at least one example embodiment of the present disclosure. Specifically, the data flow system 400 depicts functionality between the various sub-systems of the system 100, including the performance optimization prediction apparatus 102 and/or the candidate machine learning models 104.

In various embodiments, the candidate machine learning model 310 is associated with a predefined feature set 402. For example, the predefined feature set 402 can be correlated to the candidate machine learning model 310 and/or stored in a datastore such as the model profile database 106, the memory 204, or another type of storage. The predefined feature set 402 refers to a data entity that describes the candidate machine learning model 310 and/or the particular entity classification for the candidate machine learning model 310. In various embodiments, the predefined feature set 402 includes one or more numerical features, categorial features, demographic features, transaction features, spend features, revenue features, customer features, behavioral features, reactivation features, churn features, loyalty features, offer features, promotion features, campaign features, location features, and/or another type of feature. In some examples, the predefined feature set 402 can be a feature vector that represents at least a portion of a previously determined training dataset for the candidate machine learning model 310.

In various embodiments, the candidate feature generation circuitry 212 (shown in FIG. 2) can include hardware, software, firmware, and/or a combination thereof, that performs a feature modification process 403 to generate a candidate feature set 404 related to the predefined feature set 402. The candidate feature set 404 can be a modified version of the predefined feature set 402. For example, one or more features can be removed from the predefined feature set 402 to provide the candidate feature set 404 via the feature modification process 403. Additionally or alternatively, one or more features can be added to the predefined feature set 402 to provide the candidate feature set 404 via the feature modification process 403. In various embodiments, the feature modification process 403 can utilize information from the data profile 302 to determine the one or more features to remove from and/or add to the predefined feature set 402 to provide the candidate feature set 404. In various embodiments, the candidate feature set 404 can be generated by modifying the predefined feature set 402 based at least in part on a transactional behavior profile associated with the particular entity classification. The transactional behavior profile can refer to a data entity that describes the transactional behavior for one or more users and/or client devices associated with the particular entity classification. In a non-limiting example, the transactional behavior profile can include data related to historical electronic communication response data related to a particular client device or a plurality of client devices.

In various embodiments, the candidate feature generation circuitry 212 can correlate the entity identifier 303 to the candidate feature set 404. As such, the candidate feature set 404 can be generated for the entity dataset 108 while minimizing an amount of retraining or without training the candidate machine learning model 310 based on entity dataset 108, thereby reducing a number of computing resources for model training and/or reducing an amount of time for providing performance optimization predictions.

Figure 5:
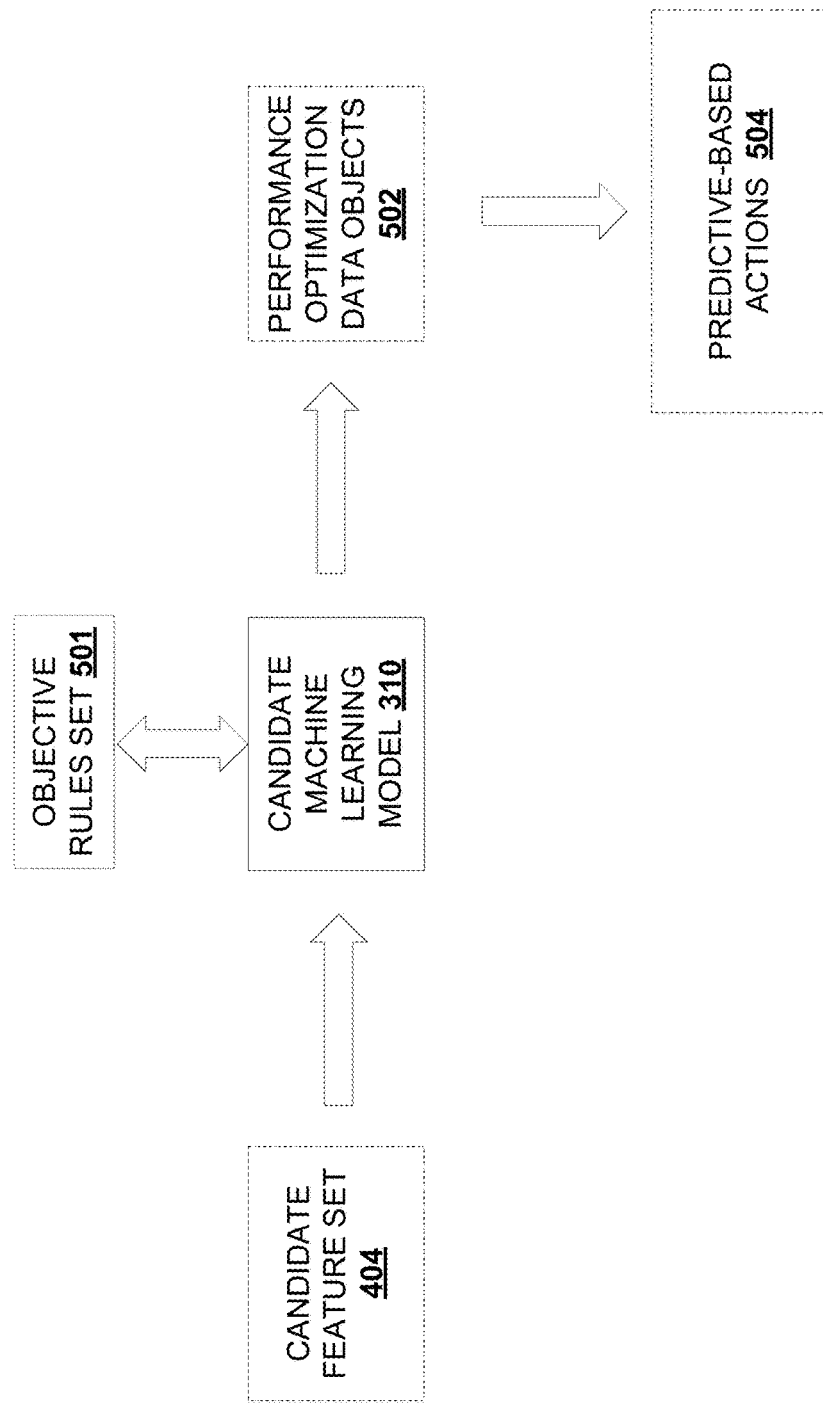
FIG. 5 illustrates an example data flow system as part of a process for providing performance optimization predictions related to a candidate feature set in accordance with at least one example embodiment of the present disclosure.

FIG. 5 illustrates an example data flow system 500 as part of a process for providing performance optimization predictions related to a candidate feature set in accordance with at least one example embodiment of the present disclosure. Specifically, the data flow system 500 depicts functionality between the various sub-systems of the system 100, including the performance optimization prediction apparatus 102, the candidate machine learning models 104, the client system 110, and/or the network 112.

In various embodiments, the performance optimization circuitry 214 (shown in FIG. 2) can include hardware, software, firmware, and/or a combination thereof, that inputs the candidate feature set 404 to the candidate machine learning model 310 to generate one or more performance optimization data objects 502. For example, the candidate machine learning model 310 can be applied to the candidate feature set 404 to generate the one or more performance optimization data objects 502. The one or more performance optimization data objects 502 can be a data construct that describes one or more prediction insights, classifications, and/or inferences provided by the candidate machine learning model 310. In various embodiments, prediction insights, classifications, and/or inferences can be with respect to one or more data objects and/or features of the candidate feature set 404. In certain embodiments, a prediction output may provide a prediction as to whether a certain degree of performance increase is achievable by utilizing the candidate machine learning model 310 and/or a variation thereof to provide one or more performance optimization predictions related to the entity dataset 108. In certain embodiments, the performance optimization circuitry 214 can apply the candidate machine learning model 310 to the candidate feature set 404 based on an objective rules set 501. In certain embodiments, the candidate machine learning model 310 may be minimally retrained prior to being applied to the candidate feature set 404. Alternatively, in certain embodiments, the candidate machine learning model 310 does not undergo retraining prior to being applied to the candidate feature set 404. In yet another embodiment, the candidate machine learning model 310 may undergo one or more full training stages prior to being applied to the candidate feature set 404. The objective rules set 501 can be a data construct that describes defined guardrails, preferred strategies, defined objectives, and/or other data for the entity identifier 303. In some embodiments, the objective rules set 501 describes performance goals, optimization goals, promotion goals, transaction goals, revenue goals, and/or one or more other goals for the entity identifier 303. For example, the objective rules set 501 may include a defined objective to reduce promotional spend by $1 revenue. In various embodiments, a plurality of performance optimization data objects 502 may be generated for a plurality of candidate machine learning models 310 to facilitate comparison therebetween.

In various embodiments, the performance optimization circuitry 214 (shown in FIG. 2) can additionally or alternatively include hardware, software, firmware, and/or a combination thereof, that initiates one or more predictive-based actions 504 based on the one or more performance optimization data objects 502. The one or more predictive-based actions 504 can include initiating a rendering of visual content via an electronic interface, initiating an API action associated with a dashboard visualization, updating a machine learning model, etc. In certain embodiments, the one or more predictive-based actions 504 can correspond to and/or trigger one or more API calls associated with data included in the one or more performance optimization data objects 502. In certain embodiments, the one or more API calls can be related to the client system 110 and/or the network. In a non-limiting example, the one or more predictive-based actions 504 can include displaying visual renderings of the aforementioned examples of predictive-based actions in addition to values, charts, and/or representations via an electronic interface.

In various embodiments, the one or more predictive-based actions 504 can include training the candidate machine learning model 310 based on the entity dataset 108 and/or utilizing the candidate machine learning model 310 for one or more machine learning tasks related to the candidate machine learning model 310 in response to a determination that the candidate machine learning model 310 satisfies performance optimization criterion. For example, the candidate machine learning model 310 can be utilized to provide classification predictions related to the entity dataset 108. In various embodiments, the one or more predictive-based actions 504 can include comparing the one or more performance optimization data objects 502 to one or more other performance optimization data objects provided by another candidate machine learning model applied to the candidate feature set 404. Additionally, the one or more predictive-based actions 504 can include training the candidate machine learning model 310 based on the entity dataset 108 in response to a determination that the candidate machine learning model 310 satisfies performance optimization criterion based on the comparison between the or more performance optimization data objects 502 and the one or more other performance optimization data objects provided by the other candidate machine learning model. In various embodiments, the one or more predictive-based actions 504 can include training the candidate machine learning model 310 based different objective rules from the objective rules set 501 to provide a corpus of predicted performance optimizations. In certain embodiments, a front-end visualization may also be provided for end-users to engage with a prediction task or another type of insight related to forecasted outputs, insights, predictions, and/or classifications.

In various embodiments, the one or more predictive-based actions 504 can include triggering training and/or execution of a new machine learning model having a model profile corresponding to the candidate machine learning model 310 using the entity dataset 108. In some embodiments, execution of the new machine learning model can result in generation of a new set of one or more performance optimization predictions based on the entity dataset 108. In some embodiments, a subsequent new machine learning model may be trained and/or executed in a subsequent cycle following execution of the new machine learning model based on collection of electronic communication response data. In some embodiments, the subsequent cycle can result in generation of a new set of one or more performance optimization predictions based on the electronic communication response data.

In various embodiments, the candidate machine learning model 310 can be generated and/or retrained by configuring a transfer learning state for the candidate machine learning model 310 based at least in part on the data profile 302 associated with the entity identifier 303. The transfer learning state can be a state for reinforcement learning and/or another type of state of performing a particular machine learning task. In various embodiments, the candidate machine learning model 310 may provide a machine learning model that is more efficient to train and/or more reliable after a trained version of the candidate machine learning model 310 is provided using the entity dataset 108. In doing so, various embodiments of the present disclosure address shortcomings of existing machine learning data analysis solutions and enable solutions that are capable of efficiently and reliably performing machine learning data analysis in various prediction domains.

The candidate machine learning model 310 may also provide significant advantages over existing technological solutions such as improved integrability, reduced complexity, improved accuracy, and/or improved speed as compared to existing technological solutions for providing insights and/or forecasts related to data. Accordingly, by utilizing the candidate machine learning model 310, various embodiments of the present disclosure enable utilizing efficient and reliable machine learning solutions to process data feature spaces with a high degree of size, diversity, and/or cardinality. In doing so, various embodiments of the present disclosure address shortcomings of existing system solutions and enable solutions that are capable of accurately, efficiently, and/or reliably providing forecasts, insights, and classifications to facilitate optimal performance optimization decisions and/or actions for a particular prediction domain.

Moreover, by utilizing the candidate machine learning model 310, one or more other technical benefits may be provided, including improved interoperability, improved reasoning, reduced errors, improved information/data mining, improved analytics, and/or the like related to machine learning. Accordingly, various embodiments disclosed herein provide improved predictive accuracy, while improving training speeds given a constant predictive accuracy. In doing so, the techniques described herein to provide the candidate machine learning model 310 may additionally, or improve efficiency and speed of training machine learning models, thus reducing the number of computational operations needed and/or the amount of training data entries needed to effectively train the candidate machine learning model 310. Accordingly, the techniques described herein improve the computational efficiency, storage-wise efficiency, and speed of training for the candidate machine learning model 310.

Figure 6:
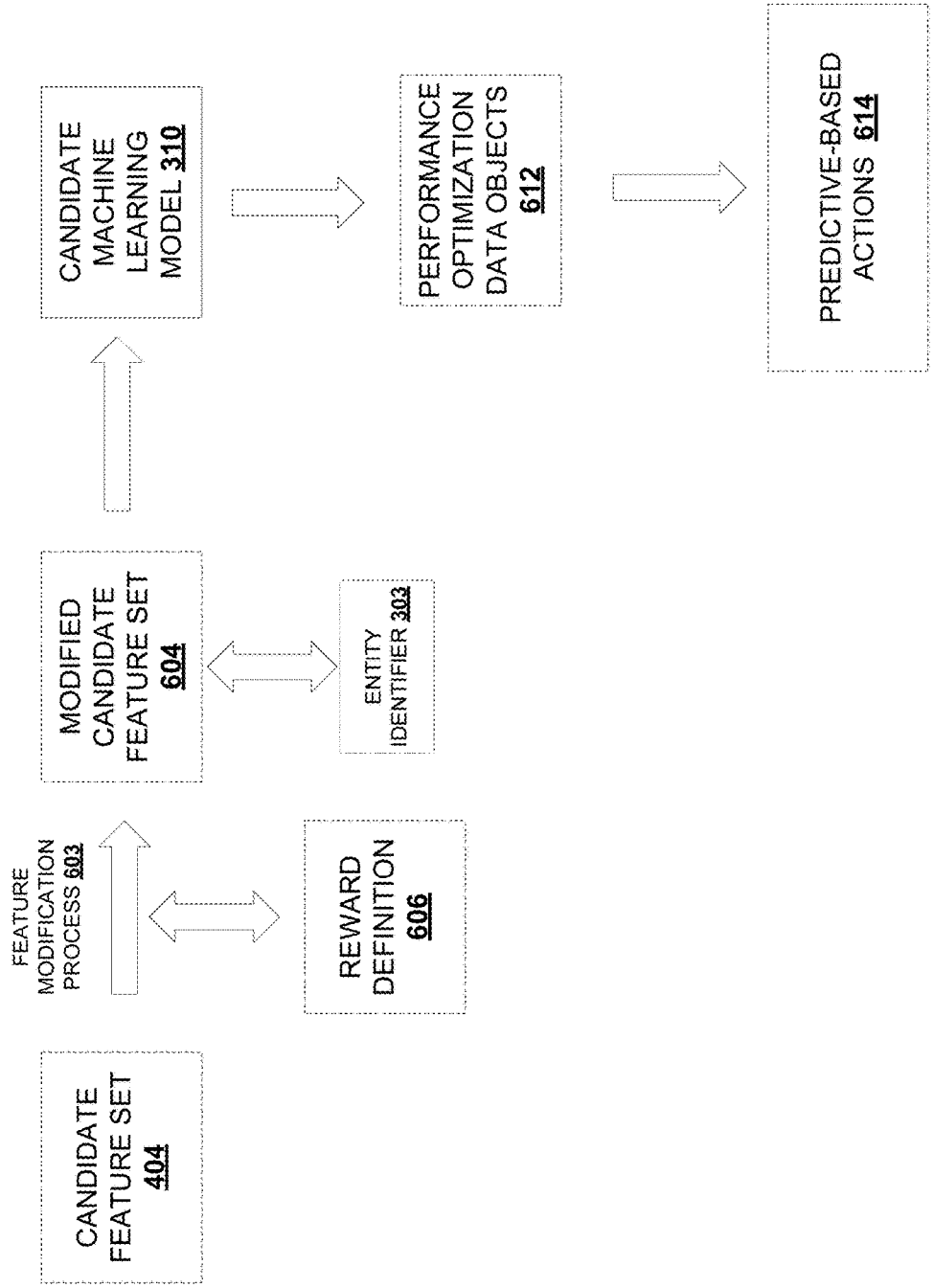
FIG. 6 illustrates an example data flow system as part of an alternate process for performance optimization predictions related to a candidate feature set in accordance with at least one example embodiment of the present disclosure.

FIG. 6 illustrates an example data flow system 600 as part of an alternate process for providing performance optimization predictions related to a candidate feature set in accordance with at least one example embodiment of the present disclosure. Specifically, the data flow system 600 depicts functionality between the various sub-systems of the system 100, including the performance optimization prediction apparatus 102, the candidate machine learning models 104, the client system 110, and/or the network 112.

In various embodiments, the candidate feature generation circuitry 212 (shown in FIG. 2) can include hardware, software, firmware, and/or a combination thereof, that performs a feature modification process 603 to generate a modified candidate feature set 604 based on the candidate feature set 404. For example, the candidate feature generation circuitry 212 can generate the modified candidate feature set 604 by modifying the candidate feature set 404 based on a reward definition 606. The reward definition 606 can define a reward for the particular entity classification related to the candidate machine learning model 310. For example, the reward definition 606 can be a data construct corresponding to a performance goal for the candidate machine learning model 310. In some embodiments, the reward definition 606 can be related to quality, accuracy, defined metrics, defined rules, defined standards, defined behavior, and/or other performance criterion utilized to establish a performance goal for output provided by the candidate machine learning model 310.

The modified candidate feature set 604 can be a modified version of the candidate feature set 404. For example, one or more features can be removed from the candidate feature set 404 to provide the modified candidate feature set 604 via the feature modification process 603. Additionally or alternatively, one or more features can be added to the candidate feature set 404 to provide the modified candidate feature set 604 via the feature modification process 603. In various embodiments, the feature modification process 603 can utilize information related to the reward definition 606 to determine the one or more features to remove from and/or add to the candidate feature set 404 to provide the modified candidate feature set 604. In various embodiments, the candidate feature generation circuitry 212 can correlate the entity identifier 303 to the modified candidate feature set 604. As such, the modified candidate feature set 604 can be generated for the entity dataset 108 while minimizing an amount of retraining or without training the candidate machine learning model 310 based on entity dataset 108, thereby reducing a number of computing resources for model training and/or reducing an amount of time for providing performance optimization predictions.

In various embodiments, the performance optimization circuitry 214 (shown in FIG. 2) can include hardware, software, firmware, and/or a combination thereof, that inputs the modified candidate feature set 604 to the candidate machine learning model 310 to generate one or more performance optimization data objects 612. For example, the candidate machine learning model 310 can be applied to the modified candidate feature set 604 to generate the one or more performance optimization data objects 612. The one or more performance optimization data objects 612 can be a data construct that describes one or more prediction insights, classifications, and/or inferences provided by the candidate machine learning model 310. In various embodiments, prediction insights, classifications, and/or inferences can be with respect to one or more data objects and/or features of the modified candidate feature set 604. In certain embodiments, a prediction output may provide a prediction as to whether a certain degree of performance increase is achievable by utilizing the candidate machine learning model 310 and/or a variation thereof to provide one or more performance optimization predictions related to the entity dataset 108. In certain embodiments, the performance optimization circuitry 214 can apply the candidate machine learning model 310 to the modified candidate feature set 604 based on an objective rules set (e.g., the objective rules set 501). In certain embodiments, the candidate machine learning model 310 may be minimally retrained prior to being applied to the modified candidate feature set 604. Alternatively, in certain embodiments, the candidate machine learning model 310 does not undergo retraining prior to being applied to the modified candidate feature set 604. In yet another embodiment, the candidate machine learning model 310 may undergo one or more full training stages prior to being applied to the modified candidate feature set 604.

In various embodiments, the performance optimization circuitry 214 (shown in FIG. 2) can additionally or alternatively include hardware, software, firmware, and/or a combination thereof, that initiates one or more predictive-based actions 614 based on the one or more performance optimization data objects 612. The one or more predictive-based actions 614 can include initiating a rendering of visual content via an electronic interface, initiating an API action associated with a dashboard visualization, updating a machine learning model, etc. In certain embodiments, the one or more predictive-based actions 614 can correspond to and/or trigger one or more API calls associated with data included in the one or more performance optimization data objects 612. In certain embodiments, the one or more API calls can be related to the client system 110 and/or the network. In certain embodiments, the one or more predictive-based actions 614 can include determining pricing for a product, good, or service.

In various embodiments, the one or more predictive-based actions 614 may include training the candidate machine learning model 310 based on the entity dataset 108 and/or utilizing the candidate machine learning model 310 for one or more machine learning tasks related to the candidate machine learning model 310 in response to a determination that the candidate machine learning model 310 satisfies performance optimization criterion. For example, the candidate machine learning model 310 may be utilized to provide classification predictions related to the entity dataset 108. In certain embodiments, a front-end visualization may also be provided for end-users to engage with a prediction task or another type of insight related to forecasted outputs, insights, predictions, and/or classifications.

In various embodiments, the one or more predictive-based actions 614 can include triggering training and/or execution of a new machine learning model having a model profile corresponding to the candidate machine learning model 310 using the entity dataset 108. In some embodiments, execution of the new machine learning model can result in generation of a new set of one or more performance optimization predictions based on the entity dataset 108. In some embodiments, a subsequent new machine learning model may be trained and/or executed in a subsequent cycle following execution of the new machine learning model based on collection of electronic communication response data. In some embodiments, the subsequent cycle can result in generation of a new set of one or more performance optimization predictions based on the electronic communication response data.

In various embodiments, the candidate machine learning model 310 associated with the modified candidate feature set 604 may provide a machine learning model that is more efficient to train and/or more reliable after a trained version of the candidate machine learning model 310 is provided using the entity dataset 108. In doing so, various embodiments of the present disclosure address shortcomings of existing machine learning data analysis solutions and enable solutions that are capable of efficiently and reliably performing machine learning data analysis in various prediction domains.

The candidate machine learning model 310 may also provide significant advantages over existing technological solutions such as improved integrability, reduced complexity, improved accuracy, and/or improved speed as compared to existing technological solutions for providing insights and/or forecasts related to data. Accordingly, by utilizing the candidate machine learning model 310, various embodiments of the present disclosure enable utilizing efficient and reliable machine learning solutions to process data feature spaces with a high degree of size, diversity, and/or cardinality. In doing so, various embodiments of the present disclosure address shortcomings of existing system solutions and enable solutions that are capable of accurately, efficiently, and/or reliably providing forecasts, insights, and classifications to facilitate optimal performance optimization decisions and/or actions for a particular prediction domain.

Moreover, by utilizing the candidate machine learning model 310, one or more other technical benefits may be provided, including improved interoperability, improved reasoning, reduced errors, improved information/data mining, improved analytics, and/or the like related to machine learning. Accordingly, various embodiments disclosed herein provide improved predictive accuracy, while improving training speeds given a constant predictive accuracy. In doing so, the techniques described herein to provide the candidate machine learning model 310 may additionally, or improve efficiency and speed of training machine learning models, thus reducing the number of computational operations needed and/or the amount of training data entries needed to effectively train the candidate machine learning model 310. Accordingly, the techniques described herein improve the computational efficiency, storage-wise efficiency, and speed of training for the candidate machine learning model 310.

Figure 7:
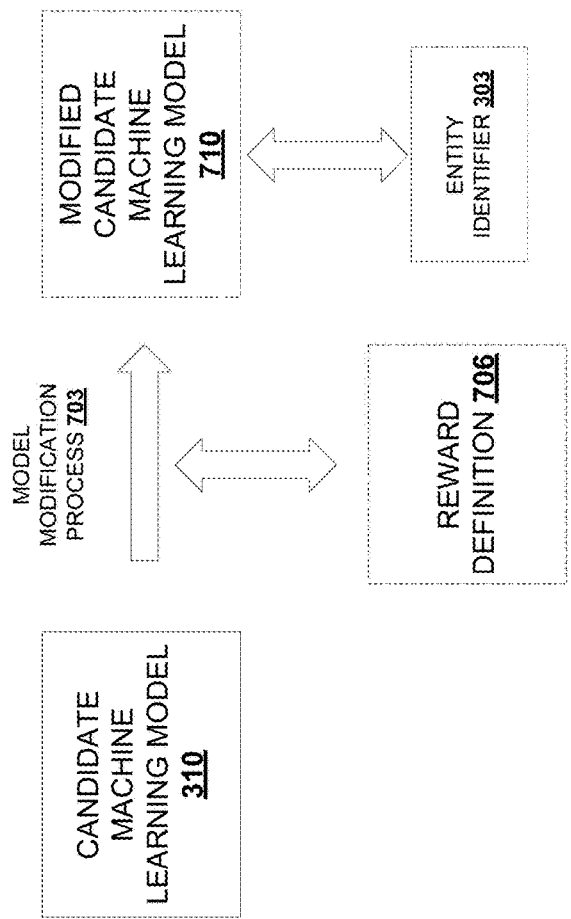
FIG. 7 illustrates an example data flow system as part of a process for modifying a candidate machine learning model in accordance with at least one example embodiment of the present disclosure.

FIG. 7 illustrates an example data flow system 700 as part of a process for modifying a candidate machine learning model in accordance with at least one example embodiment of the present disclosure. Specifically, the data flow system 700 depicts functionality between the various sub-systems of the system 100, including the performance optimization prediction apparatus 102, the candidate machine learning models 104, the client system 110, and/or the network 112.

In various embodiments, the candidate ML model circuitry 210 (shown in FIG. 2) can include hardware, software, firmware, and/or a combination thereof, that performs a model modification process 703 to generate a modified candidate machine learning model 710 based on the candidate machine learning model 310. For example, the candidate ML model circuitry 210 can modify the candidate machine learning model 310 based on a reward definition 706 to generate the modified candidate machine learning model 710. The reward definition 706 can define a reward for the particular entity classification related to the candidate machine learning model 310. The reward definition 706 can define a reward for the particular entity classification related to the candidate machine learning model 310. For example, the reward definition 706 can be a data construct corresponding to a performance goal for the candidate machine learning model 310. In some embodiments, the reward definition 706 can be related to quality, accuracy, defined metrics, defined rules, defined standards, defined behavior, and/or other performance criterion utilized to establish a performance goal for output provided by the candidate machine learning model 310. In certain embodiments, the candidate ML model circuitry 210 can modify an objective rules set (e.g., the objective rules set 510) associated with the candidate machine learning model 310 based on the reward definition 706 to generate the modified candidate machine learning model 710. In various embodiments, the candidate ML model circuitry 210 can correlate the entity identifier 303 to the modified candidate machine learning model 710.

Figure 8:
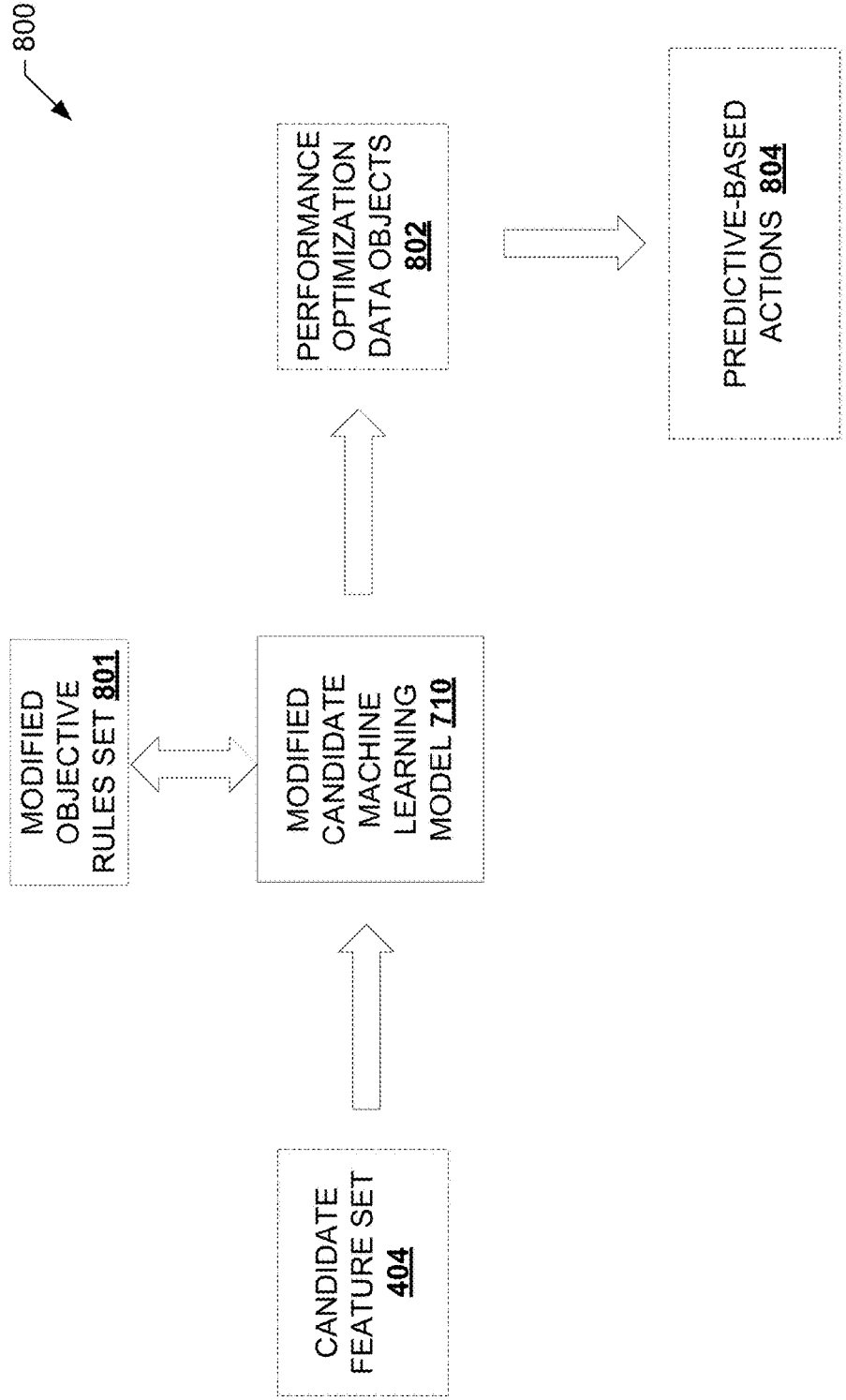
FIG. 8 illustrates an example data flow system as part of an alternate process for providing performance optimization predictions related to a candidate feature set in accordance with at least one example embodiment of the present disclosure.

FIG. 8 illustrates an example data flow system 800 as part of an alternate process for providing performance optimization predictions related to a candidate feature set in accordance with at least one example embodiment of the present disclosure. Specifically, the data flow system 800 depicts functionality between the various sub-systems of the system 100, including the performance optimization prediction apparatus 102, the candidate machine learning models 104, the client system 110, and/or the network 112.

In various embodiments, the performance optimization circuitry 214 (shown in FIG. 2) can include hardware, software, firmware, and/or a combination thereof, that inputs the candidate feature set 404 to the modified candidate machine learning model 710 to generate one or more performance optimization data objects 802. For example, the modified candidate machine learning model 710 can be applied to the candidate feature set 404 to generate the one or more performance optimization data objects 802. The one or more performance optimization data objects 802 can be a data construct that describes one or more prediction insights, classifications, and/or inferences provided by the modified candidate machine learning model 710. In various embodiments, prediction insights, classifications, and/or inferences can be with respect to one or more data objects and/or features of the candidate feature set 404. In certain embodiments, a prediction output may provide a prediction as to whether a certain degree of performance increase is achievable by utilizing the modified candidate machine learning model 710 and/or a variation thereof to provide one or more performance optimization predictions related to the entity dataset 108. In certain embodiments, the performance optimization circuitry 214 can apply the modified candidate machine learning model 710 to the candidate feature set 404 based on a modified objective rules set 801. The modified objective rules set 801 can be a modified version of an objective rules set (e.g., the objective rules set 510) associated with the candidate machine learning model 310. The modified objectives rule set 801 can include at least one or more modified guardrails, strategies, objectives, and/or other modified data for the entity identifier 303.

In various embodiments, the performance optimization circuitry 214 (shown in FIG. 2) can additionally or alternatively include hardware, software, firmware, and/or a combination thereof, that initiates one or more predictive-based actions 804 based on the one or more performance optimization data objects 802. The one or more predictive-based actions 804 can include initiating a rendering of visual content via an electronic interface, initiating an API action associated with a dashboard visualization, updating a machine learning model, etc. In certain embodiments, the one or more predictive-based actions 804 can correspond to and/or trigger one or more API calls associated with data included in the one or more performance optimization data objects 802. In certain embodiments, the one or more API calls can be related to the client system 110 and/or the network.

In various embodiments, the one or more predictive-based actions 804 may include training the modified candidate machine learning model 710 based on the entity dataset 108 and/or utilizing the modified candidate machine learning model 710 for one or more machine learning tasks related to the modified candidate machine learning model 710 in response to a determination that the modified candidate machine learning model 710 satisfies performance optimization criterion. For example, the modified candidate machine learning model 710 may be utilized to provide classification predictions related to the entity dataset 108. In certain embodiments, a front-end visualization may also be provided for end-users to engage with a prediction task or another type of insight related to forecasted outputs, insights, predictions, and/or classifications.

In various embodiments, the one or more predictive-based actions 804 can include triggering training and/or execution of a new machine learning model having a model profile corresponding to the modified candidate machine learning model 710 using the entity dataset 108. In some embodiments, execution of the new machine learning model can result in generation of a new set of one or more performance optimization predictions based on the entity dataset 108. In some embodiments, a subsequent new machine learning model may be trained and/or executed in a subsequent cycle following execution of the new machine learning model based on collection of electronic communication response data. In some embodiments, the subsequent cycle can result in generation of a new set of one or more performance optimization predictions based on the electronic communication response data.

In various embodiments, the modified candidate machine learning model 710 may provide a machine learning model that is more efficient to train and/or more reliable after a trained version of the modified candidate machine learning model 710 is provided using the entity dataset 108. In doing so, various embodiments of the present disclosure address shortcomings of existing machine learning data analysis solutions and enable solutions that are capable of efficiently and reliably performing machine learning data analysis in various prediction domains.

The modified candidate machine learning model 710 may also provide significant advantages over existing technological solutions such as improved integrability, reduced complexity, improved accuracy, and/or improved speed as compared to existing technological solutions for providing insights and/or forecasts related to data. Accordingly, by utilizing the modified candidate machine learning model 710, various embodiments of the present disclosure enable utilizing efficient and reliable machine learning solutions to process data feature spaces with a high degree of size, diversity, and/or cardinality. In doing so, various embodiments of the present disclosure address shortcomings of existing system solutions and enable solutions that are capable of accurately, efficiently, and/or reliably providing forecasts, insights, and classifications to facilitate optimal performance optimization decisions and/or actions for a particular prediction domain.

Moreover, by utilizing the modified candidate machine learning model 710, one or more other technical benefits may be provided, including improved interoperability, improved reasoning, reduced errors, improved information/data mining, improved analytics, and/or the like related to machine learning. Accordingly, various embodiments disclosed herein provide improved predictive accuracy, while improving training speeds given a constant predictive accuracy. In doing so, the techniques described herein to provide the modified candidate machine learning model 710 may additionally, or improve efficiency and speed of training machine learning models, thus reducing the number of computational operations needed and/or the amount of training data entries needed to effectively train the modified candidate machine learning model 710. Accordingly, the techniques described herein improve the computational efficiency, storage-wise efficiency, and speed of training for the modified candidate machine learning model 710.

Figure 9:
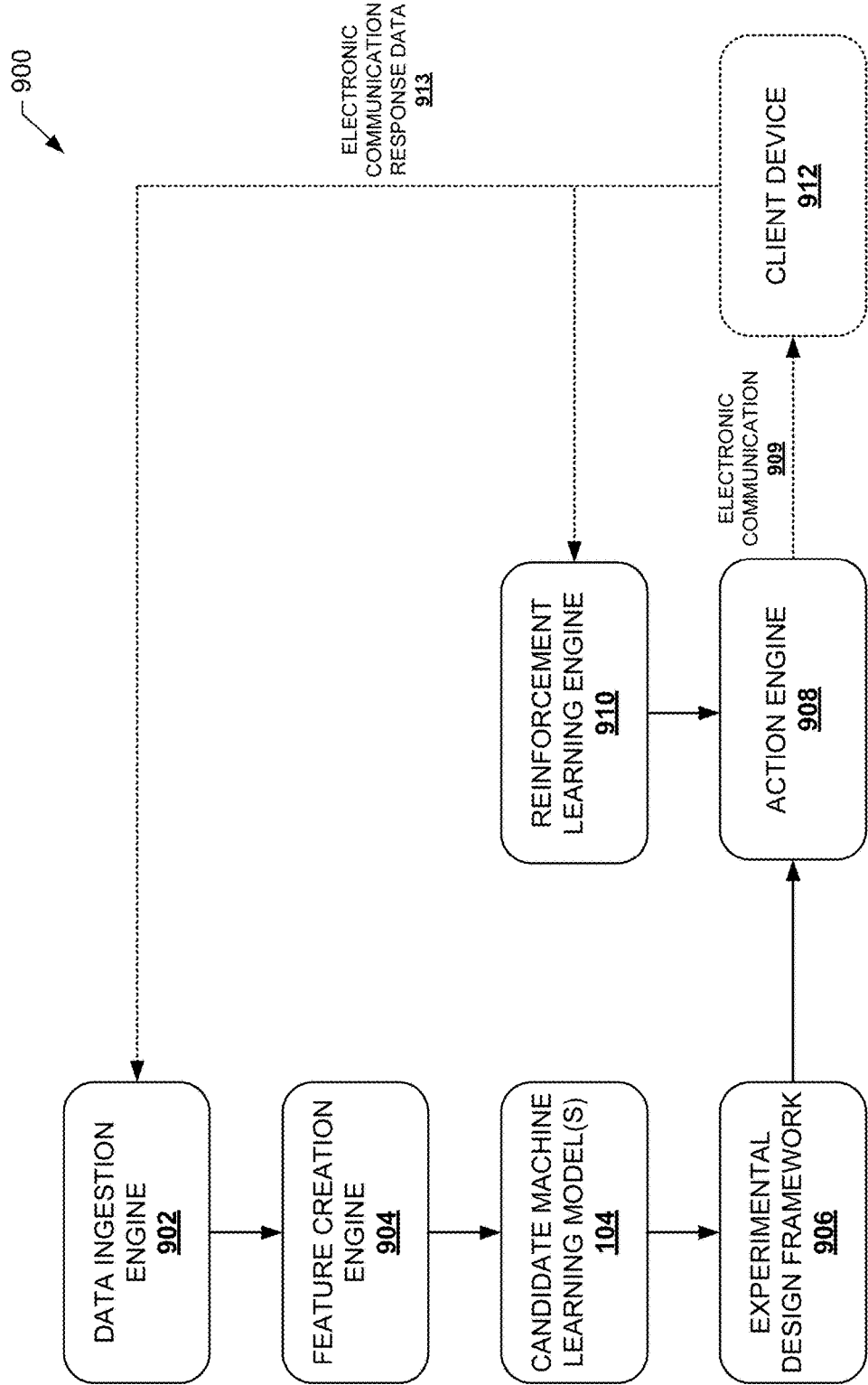
FIG. 9 illustrates an example system related to a machine learning framework in accordance with at least one example embodiment of the present disclosure.

FIG. 9 illustrates an example system 900 related to a machine learning framework in accordance with at least one example embodiment of the present disclosure. Specifically, the system 900 depicts functionality between the various sub-systems of the system 100, including the performance optimization prediction apparatus 102, the set of candidate machine learning models 104, the model profile database 106, the entity dataset 108, the client system 110, and/or the network 112. The system 900 includes a data ingestion engine 902, a feature creation engine 904, the set of candidate machine learning models 104, an experimental design framework 906, an action engine 908, a reinforcement learning engine 910, and/or a client device 912.

In various embodiments, the data ingestion engine 902 can configure one or more portions of a predefined entity dataset for processing by one or more candidate machine learning models from the set of candidate machine learning models 104. For example, the data ingestion engine 902 can correct one or more errors, inconsistencies, and/or missing values with respect to one or more portions of the predefined entity dataset. The predefined entity dataset can be a different dataset than the entity dataset 108. In certain embodiments, the predefined entity dataset is utilized as a training dataset for one or more candidate machine learning models from the set of candidate machine learning models 104. Additionally or alternatively, the data ingestion engine 902 can normalize, standardize, encode, and/or scale one or more portions of the predefined entity dataset based on one or more data formatting rules for the set of candidate machine learning models 104. In various embodiments, the feature creation engine 904 can generate one or more features for the predefined entity dataset. For example, the feature creation engine 904 can generate a predefined feature set (e.g., the predefined feature set 402) for one or more candidate machine learning models from the set of candidate machine learning models 104.

The experimental design framework 906 can manage and/or generate one or more electronic experiments with respect to the client device 912 to facilitate reinforcement learning with respect to one or more candidate machine learning models from the set of candidate machine learning models 104. The client device 912 can be a smartphone, a computer, a laptop, a tablet computer, a wearable device, a virtual reality device, an augmented reality device, a server, or another type of computing device. In various embodiments, the experimental design framework 906 can generate one or more test groups for testing different variables, parameters, hyper-parameters, weights, rules, and/or other configurations for one or more candidate machine learning models from the set of candidate machine learning models 104.

The action engine 908 can utilize the one or more electronic experiments related to the experimental design framework 906 to initiate one or more electronic interactions with the client device 912. The one or more electronic interactions can further facilitate reinforcement learning with respect to one or more candidate machine learning models from the set of candidate machine learning models 104. In various embodiments, the action engine 908 can generate an electronic communication 909 for the client device 912. The electronic communication 909 can include data related to an offer (e.g., a promotional offering). For example, the electronic communication 909 can include an invitation to redeem a promotional offering. In certain embodiments, one or more portions of the data related to an offer can be generated by one or more candidate machine learning models from the set of candidate machine learning models 104. In various embodiments, visual data related to the electronic communication 909 can be rendered via an electronic interface of the client device 912. Additionally, based on the visual data rendered via the electronic interface of the client device 912, the client device 912 can generate electronic communication response data 913. The electronic communication response data 913 can include an indication of an acceptance or a non-acceptance with respect to the offer (e.g., the promotional offering) associated with the electronic communication 909. In various embodiments, the electronic communication response data 913 can be generated based on one or more electronic interface actions with respect to the electronic interface of the client device 912. For example, the electronic communication response data 913 can be generated based on input data provided via the electronic interface of the client device 912. In certain embodiments, the electronic communication response data 913 can be generated based on an interaction with one or more interactive graphical interface elements presented via the electronic interface of the client device 912.

The reinforcement learning engine 910 can provide feedback-based training for one or more candidate machine learning models from the set of candidate machine learning models 104 via one or more reinforcement learning techniques. In various embodiments, the reinforcement learning engine 910 can provide feedback-based training for one or more candidate machine learning models from the set of candidate machine learning models 104 based on the electronic communication response data 913. For example, the electronic communication response data 913 can be utilized as an action for a reinforcement learning process associated with one or more candidate machine learning models from the set of candidate machine learning models 104. In certain embodiments, the electronic communication response data 913 can initiate a transition into a different state related to the reinforcement learning process for one or more candidate machine learning models from the set of candidate machine learning models 104. The different state can be a particular transfer learning state or another type of state for reinforcement learning.

In certain embodiments, the electronic communication response data 913 can be additionally or alternatively utilized to provide new data for a predefined entity dataset related to one or more candidate machine learning models from the set of candidate machine learning models 104. For example, a training dataset for one or more candidate machine learning models from the set of candidate machine learning models 104 can be updated based on the electronic communication response data 913. In certain embodiments, the data ingestion engine 902 can configure one or more portions of the electronic communication response data 913 for processing by one or more candidate machine learning models from the set of candidate machine learning models 104.

Figure 10:
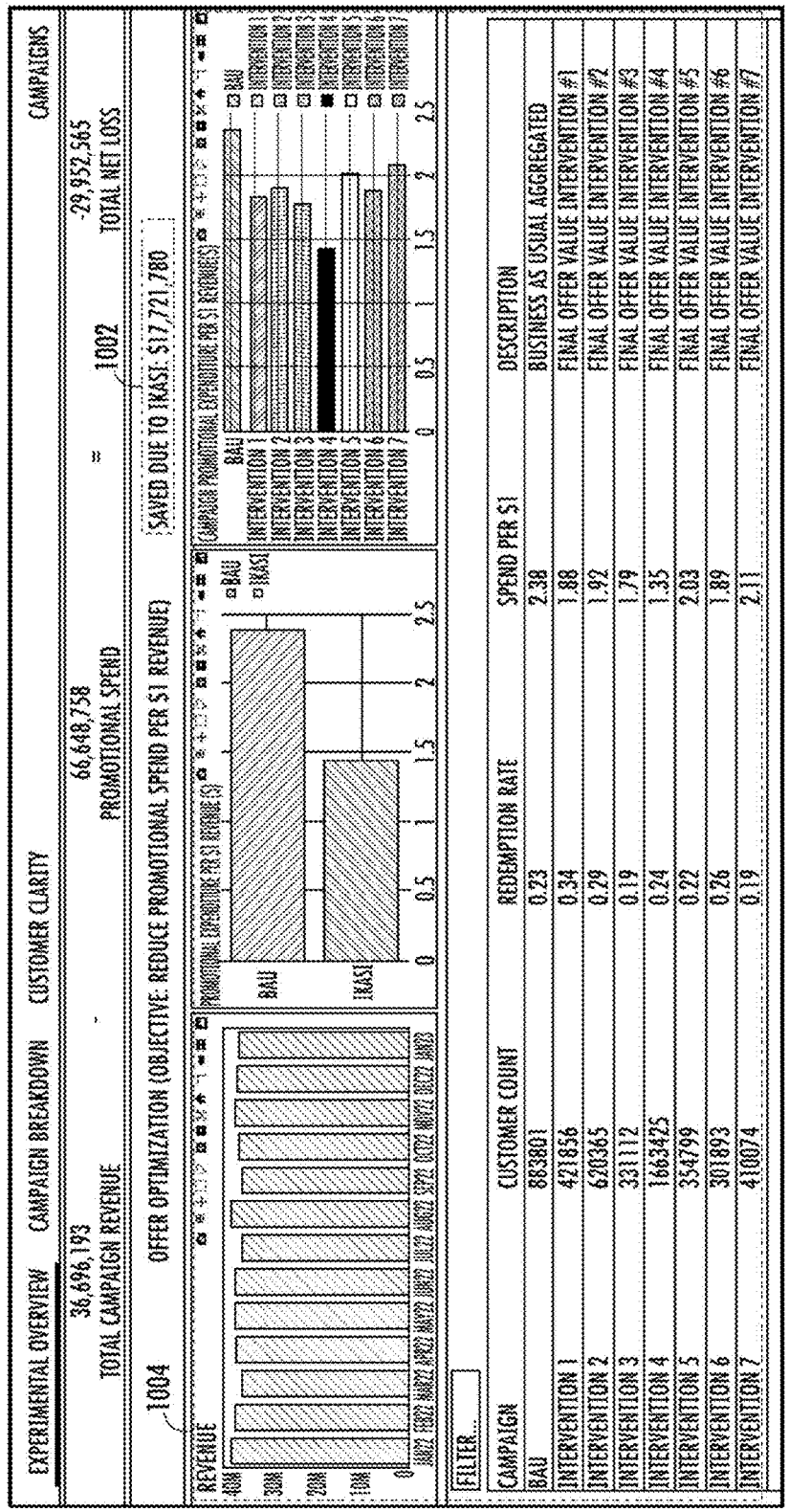
FIG. 10 illustrates an example electronic interface in accordance with at least one example embodiment of the present disclosure.

FIG. 10 provides an example an electronic interface 1000 related to visualizations in accordance with one or more embodiments of the present disclosure. In one or more embodiments, the electronic interface 1000 is, for example, a user interface (e.g., a graphical user interface) of the client system 110. In various embodiments, the electronic interface 1000 can be provided via a display of the client system 110. In some embodiments, the electronic interface 1000 can be rendered as part of a particular application accessible via the client system 110. In some such embodiments, the application may embody a user-facing application providing access to functionality of the performance optimization prediction apparatus 102. Alternatively or additionally, in some embodiments, the electronic interface 1000 can be renderable within a web application that is hosted by or otherwise grants access to the performance optimization prediction apparatus 102, for example via accessing a particular web endpoint via a browser application on the client system 110. In any such circumstances, in some embodiments, a user can utilize authentication credentials to initiate an authenticated session associated with the electronic interface 1000. In various embodiments, the user credentials can limit the user interaction with the electronic interface 1000 to only the functions authorized to the particular user (or system associated with the user). It will be appreciated that the electronic interface 1000 can include any number of a myriad of different interface element types to present one or more visualizations associated with data provided by the performance optimization prediction apparatus 102. For example, in some embodiments, the electronic interface 1000 includes one or more text labels, hyperlinks (e.g., where user interaction with the hyperlink initiates rendering of further detail associated with the data underlying the element with which the user interacted), one or more control elements, one or more interface buttons, and/or the like.

In various embodiments, the electronic interface 1000 can be configured to render a visualization related to one or more performance optimization data objects (e.g., the one or more performance optimization data objects 502, the one or more performance optimization data objects 612, the one or more performance optimization data objects 802, etc.). For example, the visualization may render one or more visual elements related to one or more performance optimization data objects provided by a candidate machine learning model (e.g., the candidate machine learning model 310 or the modified candidate machine learning model 710) from the set of candidate machine learning models 104. In certain embodiments, the electronic interface 1000 can present visual data 1002 related to a predicted performance optimization (e.g., a performance estimation) by utilizing a particular machine learning model to analyze the entity dataset 108. Additionally or alternatively, the electronic interface 1000 can present visual data 1004 related to one or more graphical interfaces that respectively present performance metrics related to utilizing a particular machine learning model to analyze the entity dataset 108. In certain embodiments, the performance metrics related to revenue, customer count, customer count changes, redemption rate, redemption rate changes, cost of acquisition, cost of acquisition change, campaign information, and/or other performance metrics. In certain embodiments, a performance metrics can be presented as a percentage change to describe an advantage to utilizing a particular machine learning model to analyze the entity dataset 108.

In some embodiments, the electronic interface 1000 can be generated to allow a user to visualize and/or manipulate aspects of a candidate machine learning model (e.g., the candidate machine learning model 310 or the modified candidate machine learning model 710) from the set of candidate machine learning models 104. Additionally or alternatively, the electronic interface 1000 can be generated to allow a user to visualize and/or manipulate aspects of input data for a candidate machine learning model to generate updates to the performance optimization data objects (e.g., in real time or near real time). The input data can include an objective rules set (e.g., the objective rules set 501 or the modified objectives rules set 810), a candidate feature set (e.g., the candidate feature set 404 or the modified candidate feature set 604), and/or other input data related to a candidate machine learning model.

Example Methods

Having described example systems and apparatuses, related data flows, and user interfaces in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence can be altered without departing from the scope of the present disclosure. For example, some of the operations depicted can be performed in parallel or in a different sequence that does not materially affect the function of the processes.

The blocks indicate operations of each process. Such operations can be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart can be combinable, replaceable, and/or otherwise altered as described herein.

Figure 11:
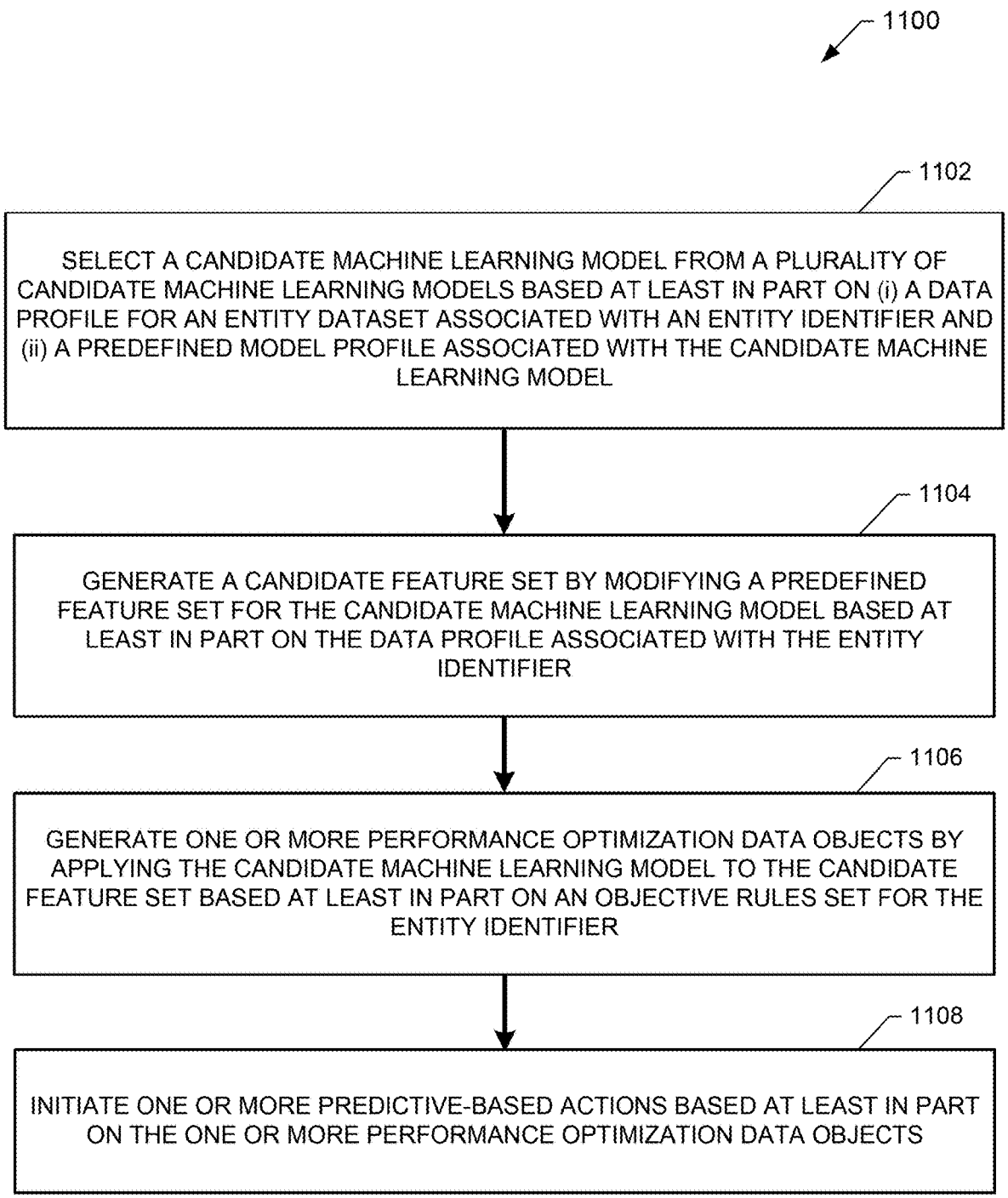
FIG. 11 illustrates a process depicting example operations for providing performance optimization predictions related to an entity dataset based on a modified version of a predefined feature set for a candidate machine learning model in accordance with at least one example embodiment of the present disclosure.

FIG. 11 illustrates a process 1100 depicting example operations for providing performance optimization predictions related to an entity dataset based on a modified version of a predefined feature set for a candidate machine learning model in accordance with at least one embodiment of the present disclosure. The process 1100 embodies an example computer-implemented method. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the performance optimization prediction apparatus 102 alone or in communication with one or more other component(s), device(s), system(s), and/or the like. In this regard, in some such embodiments, the performance optimization prediction apparatus 102 is specially configured by computer-coded instructions (e.g., computer program instructions) stored thereon, for example in the memory 204 and/or another component depicted and/or described herein and/or otherwise accessible to the performance optimization prediction apparatus 102, for performing the operations as depicted and described. In some embodiments, the performance optimization prediction apparatus 102 is in communication with one or more external apparatus(es), system(s), device(s), and/or the like, to perform one or more of the operations as depicted and described. For example, the performance optimization prediction apparatus 102 in some embodiments is in communication with a separate primary system, client system, and/or the like. For purposes of simplifying the description, the process 1100 is described as performed by and from the perspective of the performance optimization prediction apparatus 102.

According to some examples, the process 1100 includes selecting a candidate machine learning model from a plurality of candidate machine learning models based at least in part on (i) a data profile for an entity dataset associated with an entity identifier and (ii) a predefined model profile associated with the candidate machine learning model, wherein the candidate machine learning model is trained for one or more performance optimization tasks associated with a particular entity classification at block 1102. In some embodiments, the process 1100 includes determining a profile similarity score between the data profile and the predefined model profile. In some embodiments, the process 1100 additionally or alternatively includes selecting the candidate machine learning model from the plurality of candidate machine learning models based at least in part on the profile similarity score. In some embodiments, the process 1100 additionally or alternatively includes generating the candidate machine learning model by configuring a transfer learning state for the candidate machine learning model based at least in part on the data profile associated with the entity identifier.

According to some examples, the process 1100 additionally or alternatively includes generating a candidate feature set by modifying a predefined feature set for the candidate machine learning model based at least in part on the data profile associated with the entity identifier at block 1104. In some embodiments, the process 1100 includes generating the candidate feature set by modifying the predefined feature set for the candidate machine learning model based at least in part on a random sampling of the entity dataset. For example, data and/or features from the entity dataset may be randomly selected to provide the candidate feature set. In some embodiments, the process 1100 additionally or alternatively includes generating the candidate feature set by modifying the predefined feature set for the candidate machine learning model based at least in part on a transactional behavior profile associated with the particular entity classification. The transactional behavior profile may include data related to historical electronic communication response data related to a particular client device or a plurality of client devices. In some embodiments, the process 1100 additionally or alternatively includes generating the candidate feature set by modifying the predefined feature set with a synthetic dataset based at least in part on the data profile associated with the entity identifier. The synthetic dataset can be a collection of artificial data constructs that respectively provide a label or other classification for the particular entity classification. In some embodiments, the synthetic dataset can be based on inferences, characteristics, patterns, and/or distributions related to one or more labeled portions of the entity dataset. In some embodiments, the synthetic dataset can be generated based on a reinforcement learning process associated with a candidate machine learning model.

According to some examples, the process 1100 additionally or alternatively includes generating one or more performance optimization data objects by applying the candidate machine learning model to the candidate feature set based at least in part on an objective rules set for the entity identifier at bock 1106. In some embodiments, the process 1100 includes determining at least a portion of the objective rules set based at least in part on the data profile associated with the entity identifier. In some embodiments, the process 1100 additionally or alternatively includes determining at least a portion of the objective rules set based at least in part on the particular entity classification. In some embodiments, the candidate machine learning model may be minimally retrained prior to being applied to the candidate feature set. Alternatively, in some embodiments, the candidate machine learning model does not undergo retraining prior to being applied to the candidate feature set. In yet another embodiment, the candidate machine learning model may undergo one or more full training stages prior to being applied to the candidate feature set.

According to some examples, the process 1100 additionally or alternatively includes initiating one or more predictive-based actions based at least in part on the one or more performance optimization data objects at block 1108. In some embodiments, the process 1100 includes initiating a rendering of visual content via an electronic interface based at least in part on the one or more performance optimization data objects. In some embodiments, the process 1100 additionally or alternatively includes initiating an API action associated with a dashboard visualization based at least in part on the one or more performance optimization data objects. For example, the dashboard visualization at an electronic interface may generated to allow a user to visualize and/or manipulate aspects of the candidate machine learning model(s) and/or the input data (e.g., the objective rules set and/or candidate feature set) to generate updates to the performance optimization data objects (e.g., in real time or near real time).

In some embodiments, the process 1100 additionally or alternatively includes generating a modified candidate machine learning model by modifying the objective rules set based at least in part on a reward definition associated with the particular entity classification. In some embodiments, the process 1100 additionally or alternatively includes generating one or more modified performance optimization data objects associated with the entity identifier by applying the modified candidate machine learning model to the candidate feature set.

In some embodiments, the process 1100 additionally or alternatively includes generating a modified candidate feature set by modifying the candidate feature set based at least in part on a reward definition associated with the particular entity classification. In some embodiments, the process 1100 additionally or alternatively includes generating one or more modified performance optimization data objects associated with the entity identifier by applying the candidate machine learning model to the modified candidate feature set.

In some embodiments, the process 1100 additionally or alternatively includes calibrating one or more variables, parameters, hyper-parameters, weights, rules, and/or other configurations of the candidate machine learning model based at least in part on the objective rules set for the entity identifier.

In some embodiments, the process 1100 additionally or alternatively includes training a new machine learning model based at least in part on the candidate machine learning model and the entity dataset. In some embodiments, the process 1100 additionally or alternatively includes training the new machine learning model based at least in part on the predefined model profile for the candidate machine learning model. In some embodiments, the process 1100 additionally or alternatively includes generating a feature set based at least in part on the entity dataset. In some embodiments, the process 1100 additionally or alternatively includes generating one or more new performance optimization data objects by applying the new machine learning model to the feature set associated with the entity dataset. In some embodiments, the process 1100 additionally or alternatively includes initiating one or more new predictive-based actions based at least in part on the one or more new performance optimization data objects.

Example Transfer Learning

Figure 12:
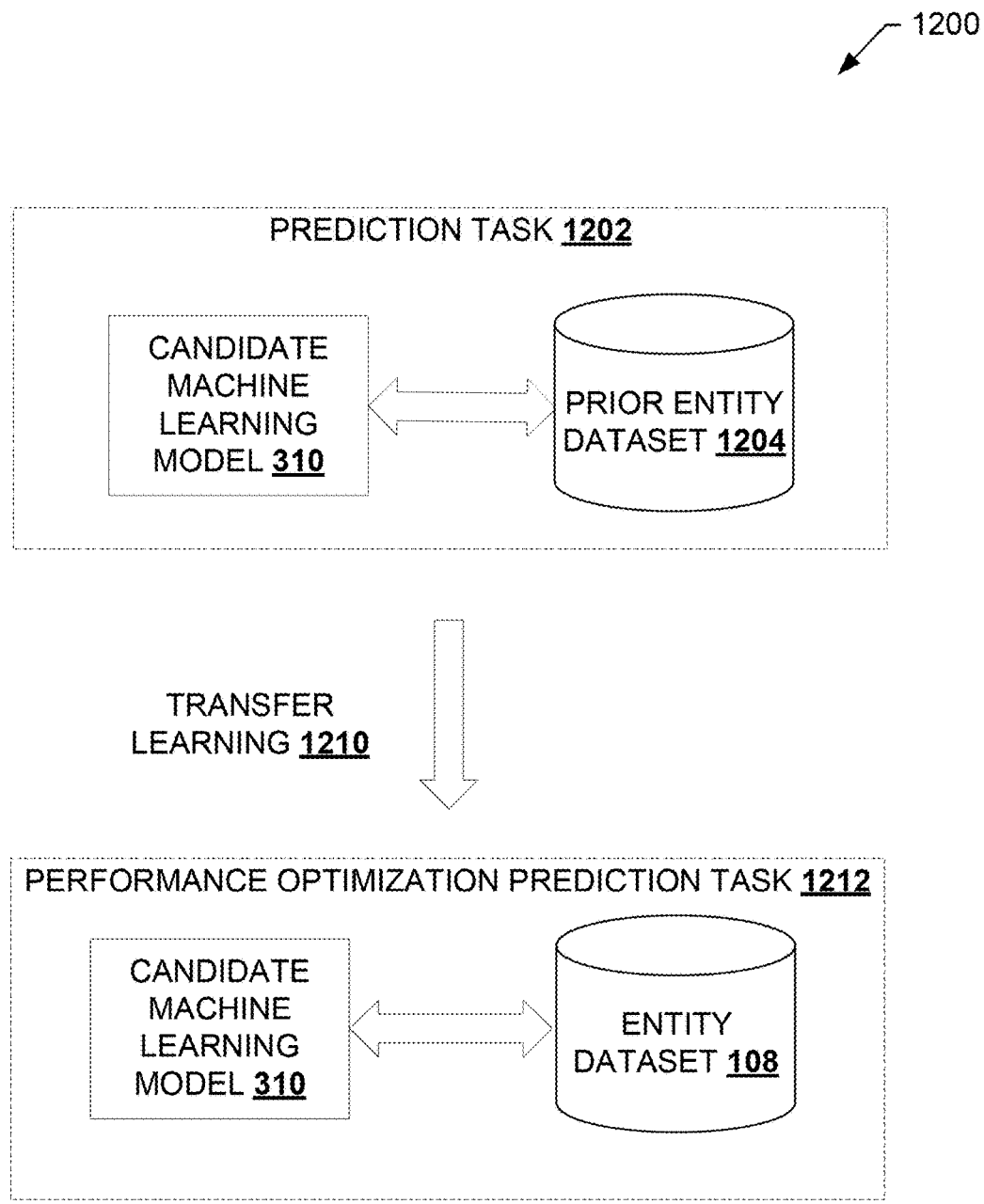
FIG. 12 illustrates an example transfer learning system in accordance with at least one example embodiment of the present disclosure.

FIG. 12 illustrates an example transfer learning system 1200 in accordance with at least one example embodiment of the present disclosure. The transfer learning system 1200 includes the candidate machine learning model 310. In various embodiments, the candidate machine learning model 310 may be a previously trained machine learning model that is previously trained for a prediction task 1202. The prediction tasks 1202 may be related to a prior entity dataset 1204 for a prior entity identifier that is different than the entity identifier 303. In various embodiments, transfer learning 1210 (e.g., including but not limited to the transfer learning processes shown and described with respect to at least FIGS. 3-8) is performed to repurpose the candidate machine learning model 310 or a modified version of the candidate machine learning model 310 for a performance optimization prediction task 1204. The performance optimization prediction task 1204 may provide one or more performance optimization predictions for the entity identifier 303 associated with the entity dataset 108 by utilizing the candidate machine learning model 310 or a modified version of the candidate machine learning model 310.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. An apparatus comprising one or more processors and one or more storage devices storing instructions that are operable, when executed by the one or more processors, to cause the one or more processors to:
perform a transfer learning process to repurpose a pre-trained candidate machine learning model for an entity dataset associated with an entity identifier, wherein the pre-trained candidate machine learning model is pre-trained for one or more performance optimization tasks associated with a different entity dataset associated with a different entity identifier, and the transfer learning process comprising:
(i) determining a data profile for the entity dataset, wherein the data profile is correlated to a first entity classification for electronic data of the entity dataset;
(ii) determining, based at least in part on a comparison between the data profile and a predefined model profile for the pre-trained candidate machine learning model, a profile similarity score indicative of a degree of similarity between the first entity classification and a second entity classification for a training dataset utilized to train the pre-trained candidate machine learning model, wherein the pre-trained candidate machine learning model is associated with a predefined feature set that that represents at least a portion of the training dataset utilized to train the pre-trained candidate machine learning model;
(iii) selecting the pre-trained candidate machine learning model from a plurality of candidate machine learning models based at least in part on the profile similarity score to enable transfer learning for a performance optimization prediction task associated with the entity identifier; and
(iv) generate a candidate feature set by modifying the predefined feature set for the pre-trained candidate machine learning model based at least in part on the data profile associated with the entity identifier;
generate one or more performance optimization data objects associated with the performance optimization prediction task by applying the pre-trained candidate machine learning model associated with the transfer learning to the candidate feature set without retraining the pre-trained candidate machine learning model; and
initiate one or more predictive-based actions based at least in part on the one or more performance optimization data objects.

2. The apparatus of claim 1, wherein the one or more storage devices store instructions that are operable, when executed by the one or more processors, to further cause the one or more processors to:
determine the profile similarity score based at least in part on a comparison between (1) an entity feature set for the entity identifier associated with the data profile and (2) the predefined feature set for the pre-trained candidate machine learning model.

3. The apparatus of claim 1, wherein the one or more storage devices store instructions that are operable, when executed by the one or more processors, to further cause the one or more processors to:
generate a modified candidate machine learning model by modifying an objective rules set for the entity identifier based at least in part on a reward definition associated with the first entity classification; and
generate one or more modified performance optimization data objects associated with the entity identifier by applying the modified candidate machine learning model to the candidate feature set.

4. The apparatus of claim 1, wherein the one or more storage devices store instructions that are operable, when executed by the one or more processors, to further cause the one or more processors to:
generate a modified candidate feature set by modifying the candidate feature set based at least in part on a reward definition associated with the first entity classification; and
generate one or more modified performance optimization data objects associated with the entity identifier by applying the pre-trained candidate machine learning model to the modified candidate feature set.

5. The apparatus of claim 1, wherein the one or more storage devices store instructions that are operable, when executed by the one or more processors, to further cause the one or more processors to:
calibrate one or more parameters of the pre-trained candidate machine learning model based at least in part on an objective rules set for the entity identifier.

6. The apparatus of claim 1, wherein the one or more storage devices store instructions that are operable, when executed by the one or more processors, to further cause the one or more processors to:
generate the pre-trained candidate machine learning model by configuring a transfer learning state for the pre-trained candidate machine learning model based at least in part on the data profile associated with the entity identifier.

7. The apparatus of claim 1, wherein the one or more storage devices store instructions that are operable, when executed by the one or more processors, to further cause the one or more processors to:
generate the candidate feature set by modifying the predefined feature set for the pre-trained candidate machine learning model based at least in part on a random sampling of the entity dataset.

8. The apparatus of claim 1, wherein the one or more storage devices store instructions that are operable, when executed by the one or more processors, to further cause the one or more processors to:
generate the candidate feature set by modifying the predefined feature set for the pre-trained candidate machine learning model based at least in part on a transactional behavior profile associated with the first entity classification.

9. The apparatus of claim 1, wherein the one or more storage devices store instructions that are operable, when executed by the one or more processors, to further cause the one or more processors to:
generate the candidate feature set by modifying the predefined feature set with a synthetic dataset based at least in part on the data profile associated with the entity identifier.

10. The apparatus of claim 1, wherein the one or more storage devices store instructions that are operable, when executed by the one or more processors, to further cause the one or more processors to:
determine at least a portion of an objective rules set for the entity identifier based at least in part on the data profile associated with the entity identifier; and
configure the pre-trained candidate machine learning model based at least in part on the objective rules set.

11. The apparatus of claim 10, wherein the one or more storage devices store instructions that are operable, when executed by the one or more processors, to further cause the one or more processors to:

determine at least a portion of the objective rules set based at least in part on the first entity classification.

12. The apparatus of claim 1, wherein the one or more storage devices store instructions that are operable, when executed by the one or more processors, to further cause the one or more processors to:
    initiate a rendering of visual content via an electronic interface based at least in part on the one or more performance optimization data objects.

13. The apparatus of claim 1, wherein the one or more storage devices store instructions that are operable, when executed by the one or more processors, to further cause the one or more processors to:
    initiate an application programming interface (API) action associated with a dashboard visualization based at least in part on the one or more performance optimization data objects.

14. A computer-implemented method, comprising:
    performing a transfer learning process to repurpose a pre-trained candidate machine learning model for an entity dataset associated with an entity identifier, wherein the pre-trained candidate machine learning model is pre-trained for one or more performance optimization tasks associated with a different entity dataset associated with a different entity identifier, and the transfer learning process comprising:
    (i) determining a data profile for the entity dataset, wherein the data profile is correlated to a first entity classification for electronic data of the entity dataset;
    (ii) determining, based at least in part on a comparison between the data profile and a predefined model profile for the pre-trained candidate machine learning model, a profile similarity score indicative of a degree of similarity between the first entity classification and a second entity classification for a training dataset utilized to train the pre-trained candidate machine learning model, wherein the pre-trained candidate machine learning model is associated with a predefined feature set that that represents at least a portion of a previously determined training dataset utilized to train the pre-trained candidate machine learning model;
    (iii) selecting the pre-trained candidate machine learning model from a plurality of candidate machine learning models based at least in part on the profile similarity score to enable transfer learning for a performance optimization prediction task associated with the entity identifier; and
    (iv) generating a candidate feature set by modifying the predefined feature set for the pre-trained candidate machine learning model based at least in part on the data profile associated with the entity identifier;
    generating one or more performance optimization data objects associated with the performance optimization prediction task by applying the pre-trained candidate machine learning model associated with the transfer learning to the candidate feature set; and
    initiating one or more predictive-based actions based at least in part on the one or more performance optimization data objects.

15. The computer-implemented method of claim 14, wherein determining the profile similarity score comprises:
    determining the profile similarity score based at least in part on a comparison between (i) an entity feature set for the entity identifier associated with the data profile and (ii) the predefined feature set for the pre-trained candidate machine learning model.

16. The computer-implemented method of claim 14, further comprising:
    generating a modified candidate machine learning model by modifying an objective rules set for the entity identifier based at least in part on a reward definition associated with the first entity classification; and
    generating one or more modified performance optimization data objects associated with the entity identifier by applying the modified candidate machine learning model to the candidate feature set.

17. The computer-implemented method of claim 14, further comprising:
    generating a modified candidate feature set by modifying the candidate feature set based at least in part on a reward definition associated with the first entity classification; and
    generate one or more modified performance optimization data objects associated with the entity identifier by applying the pre-trained candidate machine learning model to the modified candidate feature set.

18. The computer-implemented method of claim 14, wherein generating the candidate feature set comprises:
    modifying the predefined feature set for the pre-trained candidate machine learning model based at least in part on a transactional behavior profile associated with the first entity classification.

19. The computer-implemented method of claim 14, wherein generating the candidate feature set comprises:
    modifying the predefined feature set with a synthetic dataset based at least in part on the data profile associated with the entity identifier.

20. A computer program product, stored on a computer readable medium, comprising instructions that when executed by one or more computers cause the one or more computers to:
    perform a transfer learning process to repurpose a pre-trained candidate machine learning model for an entity dataset associated with an entity identifier, wherein the pre-trained candidate machine learning model is pre-trained for one or more performance optimization tasks associated with a different entity dataset associated with a different entity identifier, and the transfer learning process comprising:
    (i) determining a data profile for the entity dataset, wherein the data profile is correlated to a first entity classification for electronic data of the entity dataset;
    (ii) determining, based at least in part on a comparison between the data profile and a predefined model profile for the pre-trained candidate machine learning model, a profile similarity score indicative of a degree of similarity between the first entity classification and a second entity classification for a training dataset utilized to train the pre-trained candidate machine learning model, wherein the pre-trained candidate machine learning model is associated with a predefined feature set that that represents at least a portion of a previously determined training dataset utilized to train the pre-trained candidate machine learning model;
    (iii) selecting the pre-trained candidate machine learning model from a plurality of candidate machine learning models based at least in part on the profile similarity score to enable transfer learning for a performance optimization prediction task associated with the entity identifier; and
    (iv) generating a candidate feature set by modifying the predefined feature set for the pre-trained candidate machine learning model based at least in part on the data profile associated with the entity identifier;
generate one or more performance optimization data objects associated with the performance optimization prediction task by applying the pre-trained candidate machine learning model associated with the transfer learning to the candidate feature set; and
initiate one or more predictive-based actions based at least in part on the one or more performance optimization data objects.

* * * * *

UNITED STATES PATENT AND TRADEMARK OFFICE
CERTIFICATE OF CORRECTION

| | | |
|---|---|---|
| PATENT NO. | : 12,373,736 B1 | Page 1 of 1 |
| APPLICATION NO. | : 18/410374 | |
| DATED | : July 29, 2025 | |
| INVENTOR(S) | : Samuel Owen et al. | |

It is certified that error appears in the above-identified patent and that said Letters Patent is hereby corrected as shown below:

In the Claims

In Column 35, Line 24, Claim 1, delete "set that that" and insert -- set that --, therefor.
In Column 35, Line 33, Claim 1, delete "(iv) generate" and insert -- (iv) generating --, therefor.
In Column 37, Line 39, Claim 14, delete "set that that" and insert -- set that --, therefor.
In Column 38, Line 56, Claim 20, delete "set that that" and insert -- set that --, therefor.

Signed and Sealed this
Thirteenth Day of January, 2026

John A. Squires
*Director of the United States Patent and Trademark Office*